United States Patent
Shah et al.

(10) Patent No.: US 12,504,908 B1
(45) Date of Patent: Dec. 23, 2025

(54) DATA RECOVERY IN NONVOLATILE MEMORY WITH DEFECTIVE WORD LINE

(71) Applicant: Sandisk Technologies, Inc., Milpitas, CA (US)

(72) Inventors: Grishma Shah, Milpitas, CA (US); Rajan Paudel, Fremont, CA (US); Deepak Bharadwaj, Fremont, CA (US); Navkiran Kaur Sandhu, Dublin, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/749,669

(22) Filed: Jun. 21, 2024

(51) Int. Cl.
*G06F 3/06* (2006.01)

(52) U.S. Cl.
CPC ......... *G06F 3/0652* (2013.01); *G06F 3/0619* (2013.01); *G06F 3/0679* (2013.01)

(58) Field of Classification Search
CPC ..... G06F 3/0652; G06F 3/0619; G06F 3/0679
USPC .......................................... 714/6.1; 711/103
See application file for complete search history.

(56) References Cited

U.S. PATENT DOCUMENTS

| | | | |
|---|---|---|---|
| 8,213,240 B2 | 7/2012 | Kim | |
| 8,305,807 B2 | 11/2012 | Shah et al. | |
| 8,307,241 B2 | 11/2012 | Avila et al. | |
| RE45,520 E | 5/2015 | Dutta et al. | |
| 9,105,349 B2 | 8/2015 | Avila et al. | |
| 9,785,493 B1 | 10/2017 | Zhang et al. | |
| 2015/0046770 A1* | 2/2015 | Luo | G06F 11/1402 714/764 |
| 2019/0279732 A1* | 9/2019 | Huang | G11C 29/50 |
| 2023/0058836 A1* | 2/2023 | Pachamuthu | G11C 11/5628 |
| 2024/0185933 A1* | 6/2024 | Park | G11C 16/0483 |
| 2025/0087277 A1* | 3/2025 | Lien | G11C 16/3418 |

* cited by examiner

*Primary Examiner* — Than Nguyen
(74) *Attorney, Agent, or Firm* — Pearl Cohen Zedek Latzer Baratz LLP

(57) ABSTRACT

An apparatus includes control circuits configured to connect to word lines that are coupled to NAND strings. The control circuits are configured to detect a defective word line, apply single word line erase voltages to the word lines to erase memory cells of the defective word line and, with the memory cells of the defective word line in an erased state, read data from neighboring memory cells of the NAND strings.

20 Claims, 22 Drawing Sheets

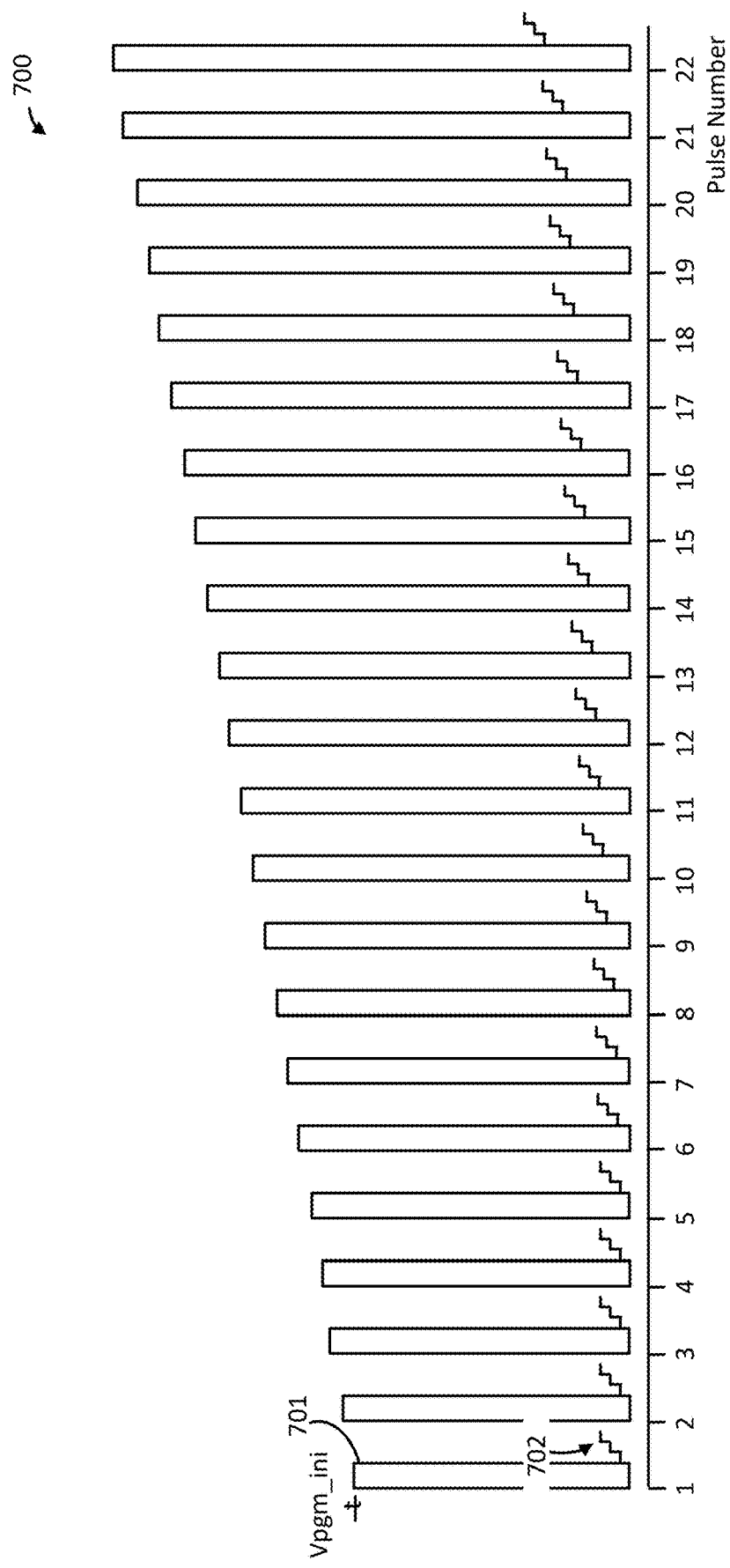

US 12,504,908 B1

DATA RECOVERY IN NONVOLATILE MEMORY WITH DEFECTIVE WORD LINE

BACKGROUND

The present technology relates to nonvolatile memory and operations for recovering data from nonvolatile memory.

Semiconductor memory is widely used in various electronic devices such as cellular telephones, digital cameras, personal digital assistants, medical electronics, mobile computing devices, non-mobile computing devices and data servers. Semiconductor memory may comprise nonvolatile memory or volatile memory. A nonvolatile memory allows information to be stored and retained even when the nonvolatile memory is not connected to a source of power (e.g., a battery). Examples of nonvolatile memory include flash memory (e.g., NAND-type and NOR-type flash memory), Electrically Erasable Programmable Read-Only Memory (EEPROM), and others. In NAND memory, memory cells are connected in series to form NAND strings. Some memories store one bit per cell using two data states (Single Level Cell or SLC) while others store more than one bit per cell using more than two data states (Multi Level Cell or MLC, which may store two bits per cell). Storing four bits per cell may use sixteen data states may (Quad Level Cell or QLC).

When a data storage system that includes nonvolatile memory is deployed in or connected to an electronic device (the host), the memory system can be used to store data and read data. For example, data may be stored in response to a program (write) command. Data may be read in response to a read command that specifies the data to be read. In some cases, defects in nonvolatile memories may result in failure to program and/or read data. In some cases, such failures may affect substantial areas of a memory array containing substantial amounts of data. Recovering data from such affected areas may be challenging.

BRIEF DESCRIPTION OF THE DRAWINGS

Like-numbered elements refer to common components in the different Figures.

FIGS. 7A-C show examples of effects of a defective word line in program and read operations.

DETAILED DESCRIPTION

Techniques are disclosed herein to detect a defective word line in a NAND memory (e.g., a defective word line that may affect a significant amount of data). A program fail when attempting to program data in a block or a read fail when attempting to read data from a block may indicate that the block contains a defective word line (e.g., a defective word line that is short-circuited so that its voltage cannot be controlled). In response to such a failure, control circuits may determine if a defective word line is present in the block and, if a defective word line is present, identify which word line is defective. A single word line erase operation may then be performed to erase all memory cells of the defective word line while leaving memory cells of other word lines in programmed states. With memory cells of the defective word line in an erased state (e.g., having negative threshold voltages) the memory cells are on (channels under the defective word line is conductive), which enables reading of other memory cells coupled to the same channels (other memory cells of the same NAND strings). Raw data may be read and subject to de-XOR operations to obtain recovered data, which may be stored in another block.

Aspects of the present technology are directed to technical problems associated with recovery of data that is stored in a block of NAND memory that includes a defective word line. The present technology includes technical solutions that include identifying the defective word line and performing a single word line erase to enable reading of previously programmed data.

Figure 1:
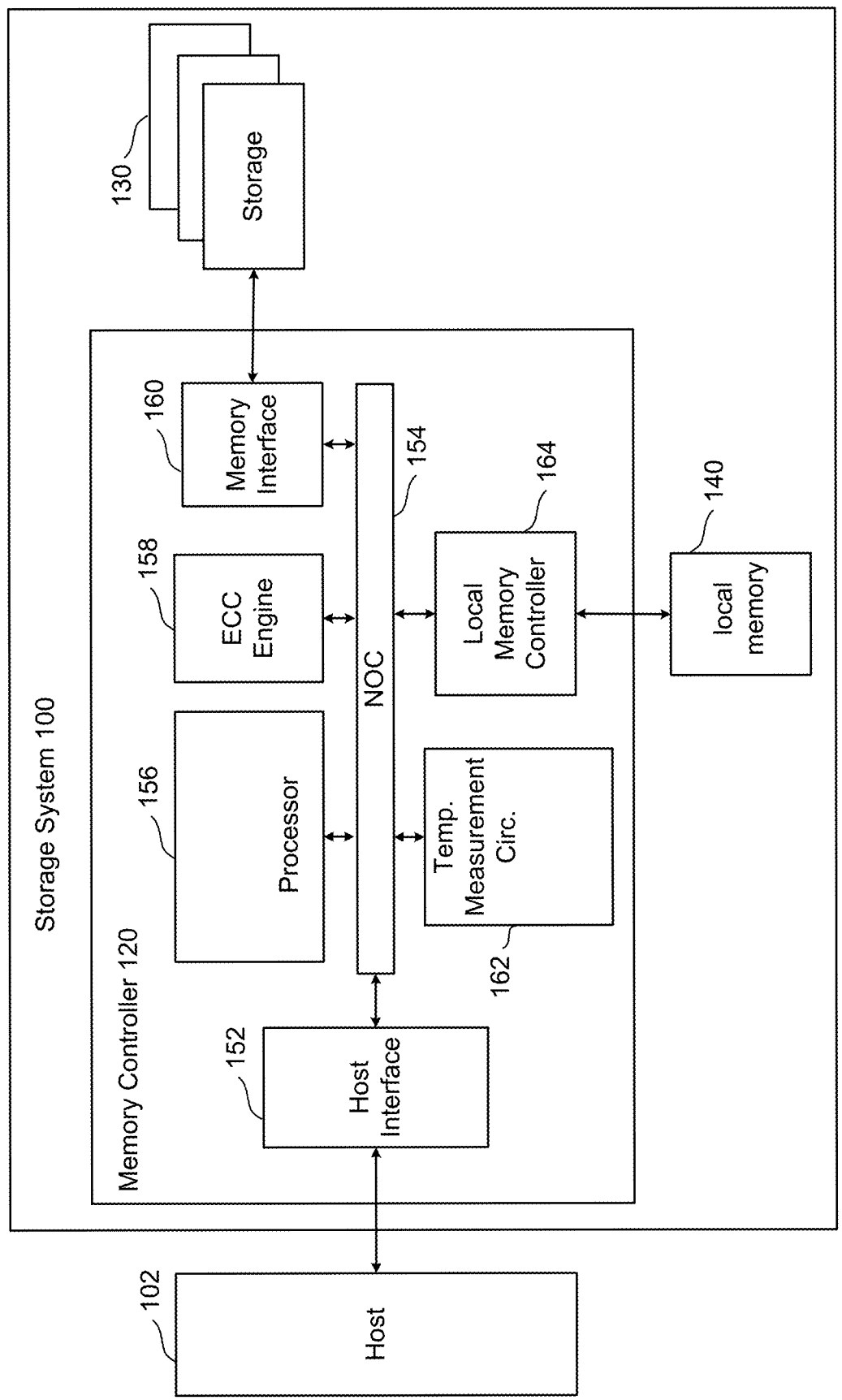
FIG. 1 is a block diagram depicting one embodiment of a storage system.

FIG. 1 is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to nonvolatile storage 130 and local high speed memory 140 (e.g., DRAM, SRAM, MRAM). Local memory 140 is non-transitory memory, which may include volatile memory or nonvolatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus.

Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the nonvolatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with nonvolatile storage 130. In one embodiment, memory interface provides a Toggle Mode interface. Other interfaces can also be used. In some example implementations, memory interface 160 (or another portion of memory controller 120) implements a scheduler and buffer for transmitting data to and receiving data from one or more memory die.

Temperature measurement circuit 162 includes temperature transducer 163 located in memory controller 120 (e.g., formed in a memory controller die). Temperature measurement circuit 162 may generate temperature measurement values from temperature sensing by temperature transducer 163 (e.g., from measurement of a current, voltage, resistance or other metric or some combination of metrics).

Figure 2A:
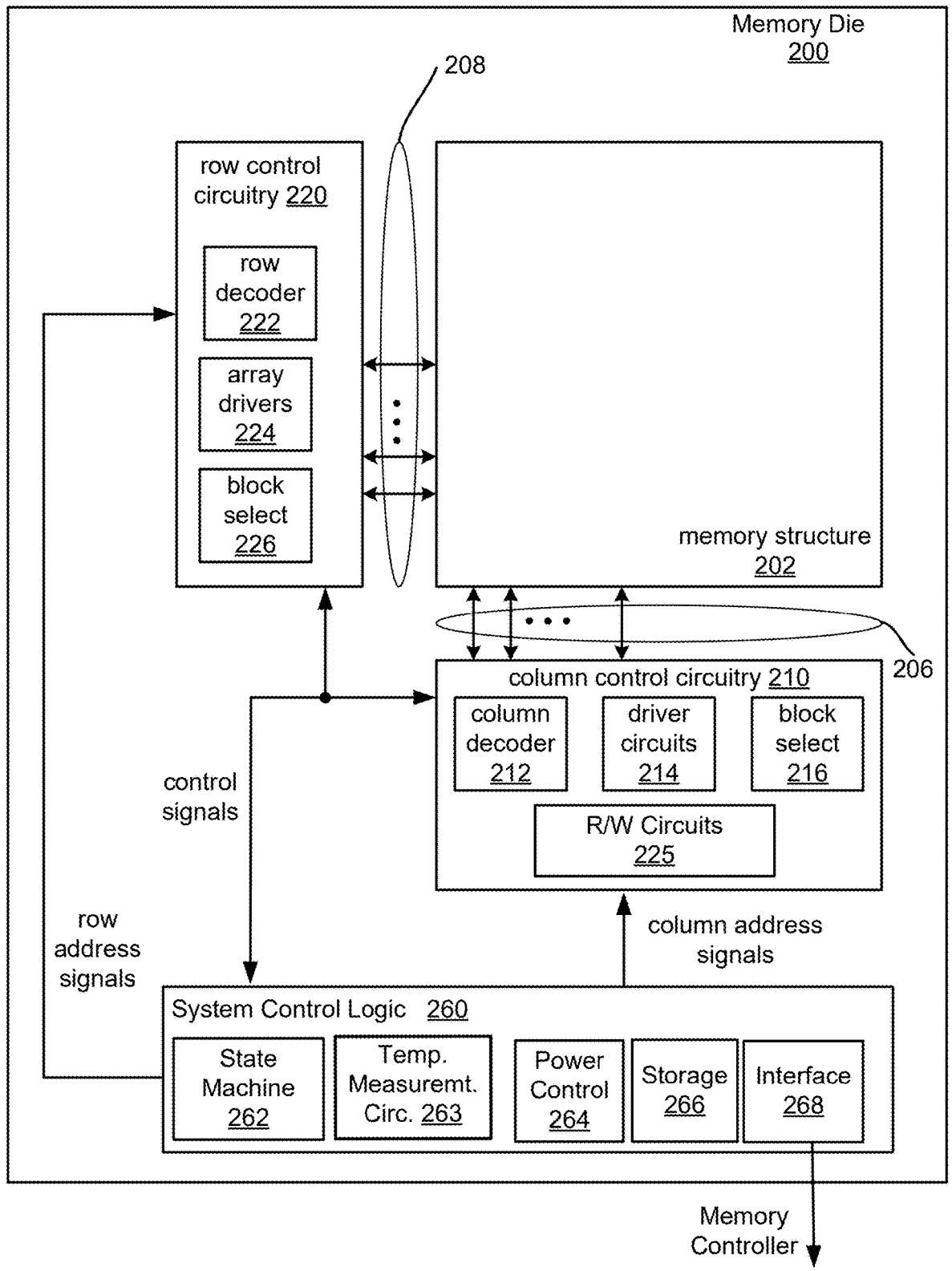
FIG. 2A is a block diagram of one embodiment of a memory die.

In one embodiment, nonvolatile storage 130 comprises one or more memory dies. FIG. 2A is a functional block diagram of one embodiment of a memory die 200 that comprises nonvolatile storage 130. Each of the one or more memory dies of nonvolatile storage 130 can be implemented as memory die 200 of FIG. 2A. The components depicted in FIG. 2A are electrical circuits. Memory die 200 includes a memory structure 202 (e.g., memory array) that can comprise nonvolatile memory cells (also referred to as nonvolatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic 260, and typically may include such circuits as row decoders 222, array drivers 224, and block select circuit 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only a single block is shown for memory structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuit 216, as well as read/write circuitry, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202. Temperature measurement circuit 263 may generate temperature measurement values from temperature sensing by one or more temperature transducers located in memory die 200. Temperature measurement values obtained by temperature measurement circuit 263 may be used by system control logic 260, read/write circuits 225 and/or other components to apply temperature adjustment according to on-chip temperature. Temperature measurement circuit 263 may be provided instead of or in addition to temperature measurement circuit 162.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of nonvolatile memory cells in which multiple memory levels are formed above a single substrate, such as a wafer. The memory structure may comprise any type of nonvolatile memory that are monolithically formed in one or more physical levels of memory cells having an active area disposed above a silicon (or other type of) substrate. In one example, the nonvolatile memory cells comprise vertical NAND strings with charge-trapping layers.

In another embodiment, memory structure 202 comprises a two-dimensional memory array of nonvolatile memory cells. In one example, the nonvolatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular nonvolatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

Figure 2B:
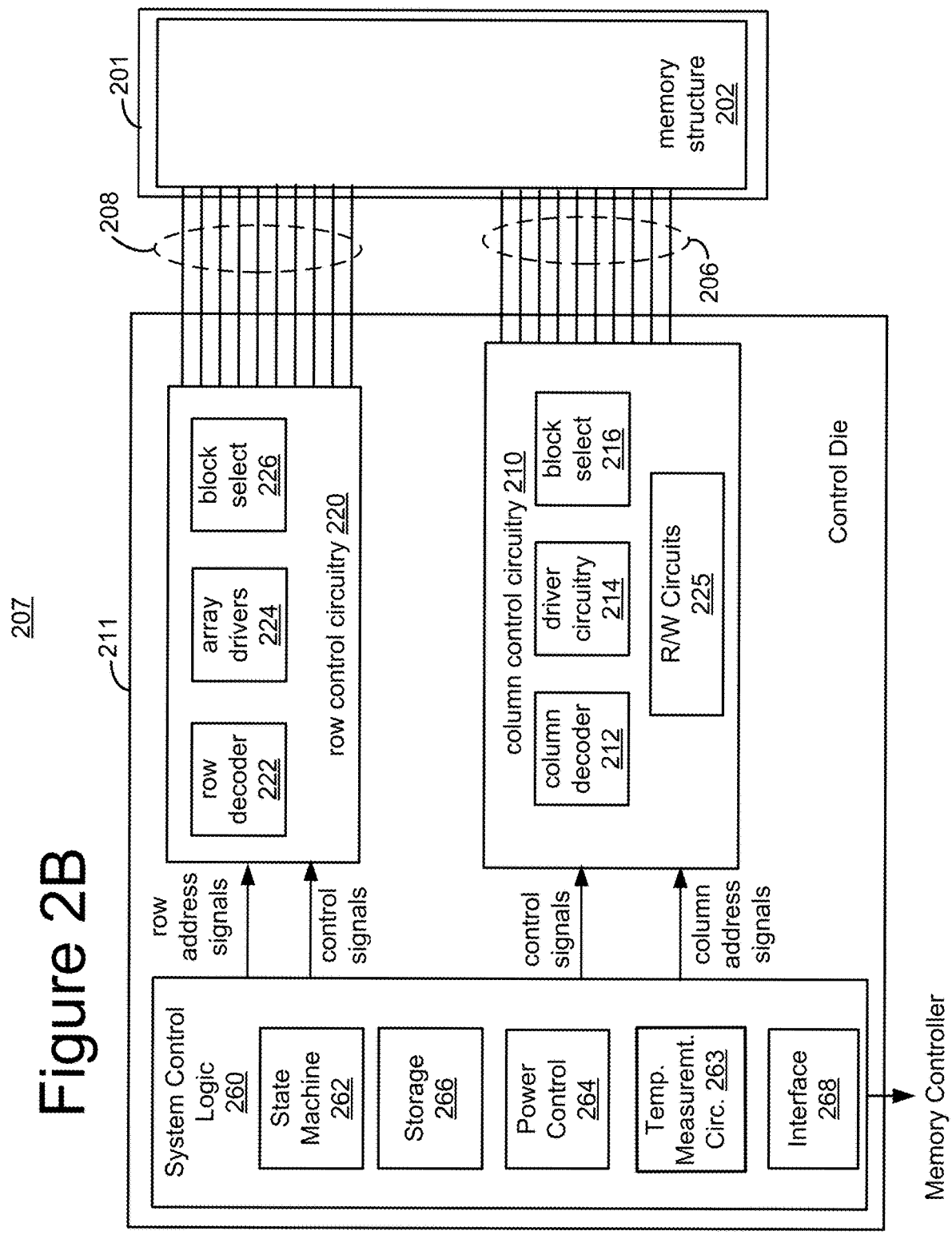
FIG. 2B is a block diagram of an example of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the nonvolatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate memory controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuits 214, and block select circuit 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select circuit 226 are coupled to memory structure 202 through electrical paths 208. Each of electrical path 208 may correspond to a word line, dummy word line, or select gate line. Additional electrical paths may also be provided between control die 211 and memory structure die 201. For example, one or more temperature transducer may be provided in memory structure die 201 and may be connected to system control logic 260 in control die 211 so that system control logic 260 may use temperature measurement values obtained from such temperature transducer(s) to adjust operating parameters according to temperature as appropriate. Temperature transducers may also or alternatively be provided in control die 211 and/or memory controller 120.

For purposes of this document, the phrases "a control circuit" or "one or more control circuits" can include any one of or any combination of memory controller 120, state machine 262, power control module 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 120, storage 130, memory die 200, integrated memory assembly 207, and/or control die 211.

Figure 3:
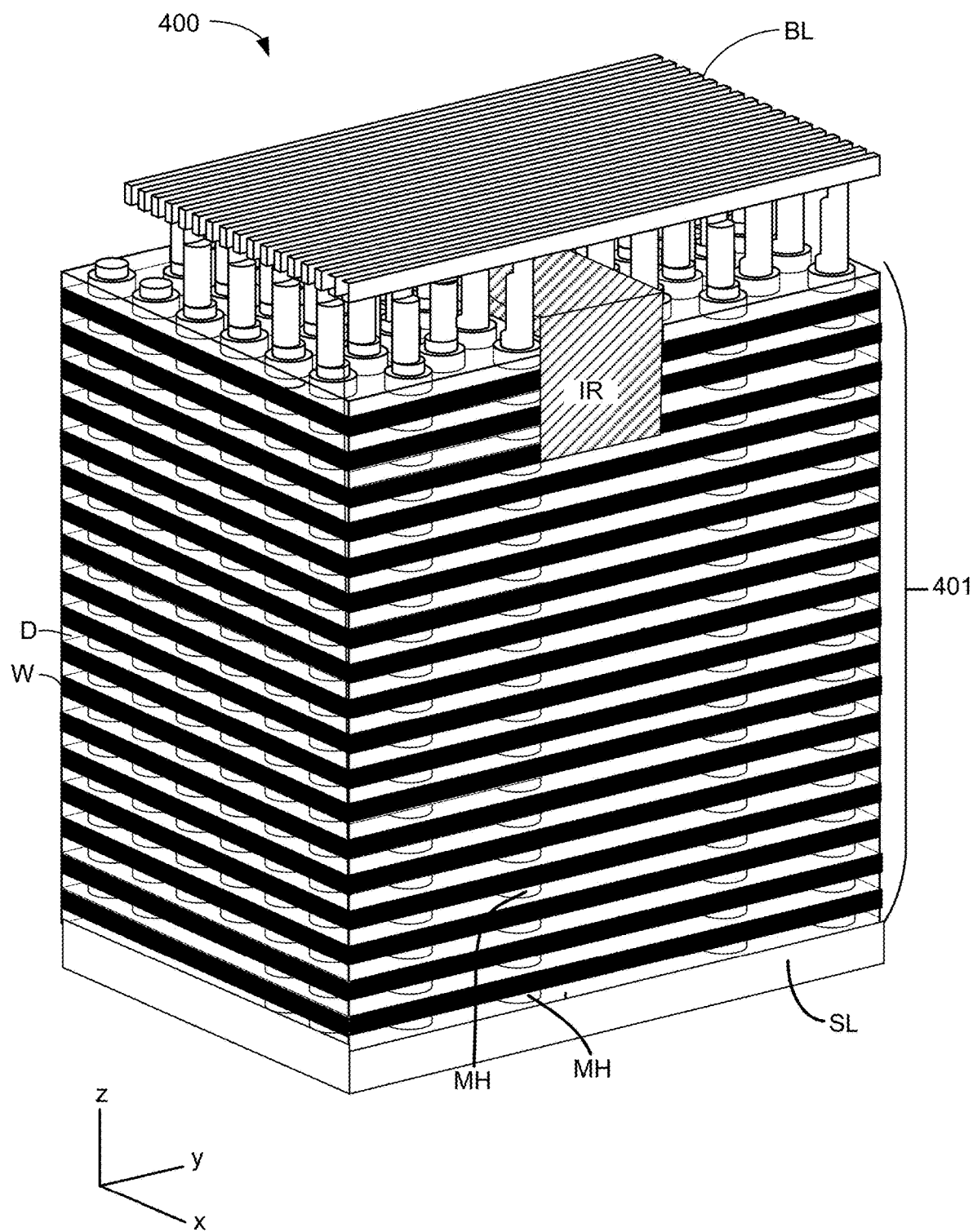
FIG. 3 shows an example of a portion of a memory structure.

FIG. 3 is a perspective view of a portion of one example embodiment of a monolithic three dimensional memory array/structure that can comprise memory structure 202, which includes a plurality nonvolatile memory cells arranged as vertical NAND strings. For example, FIG. 3 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 3 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
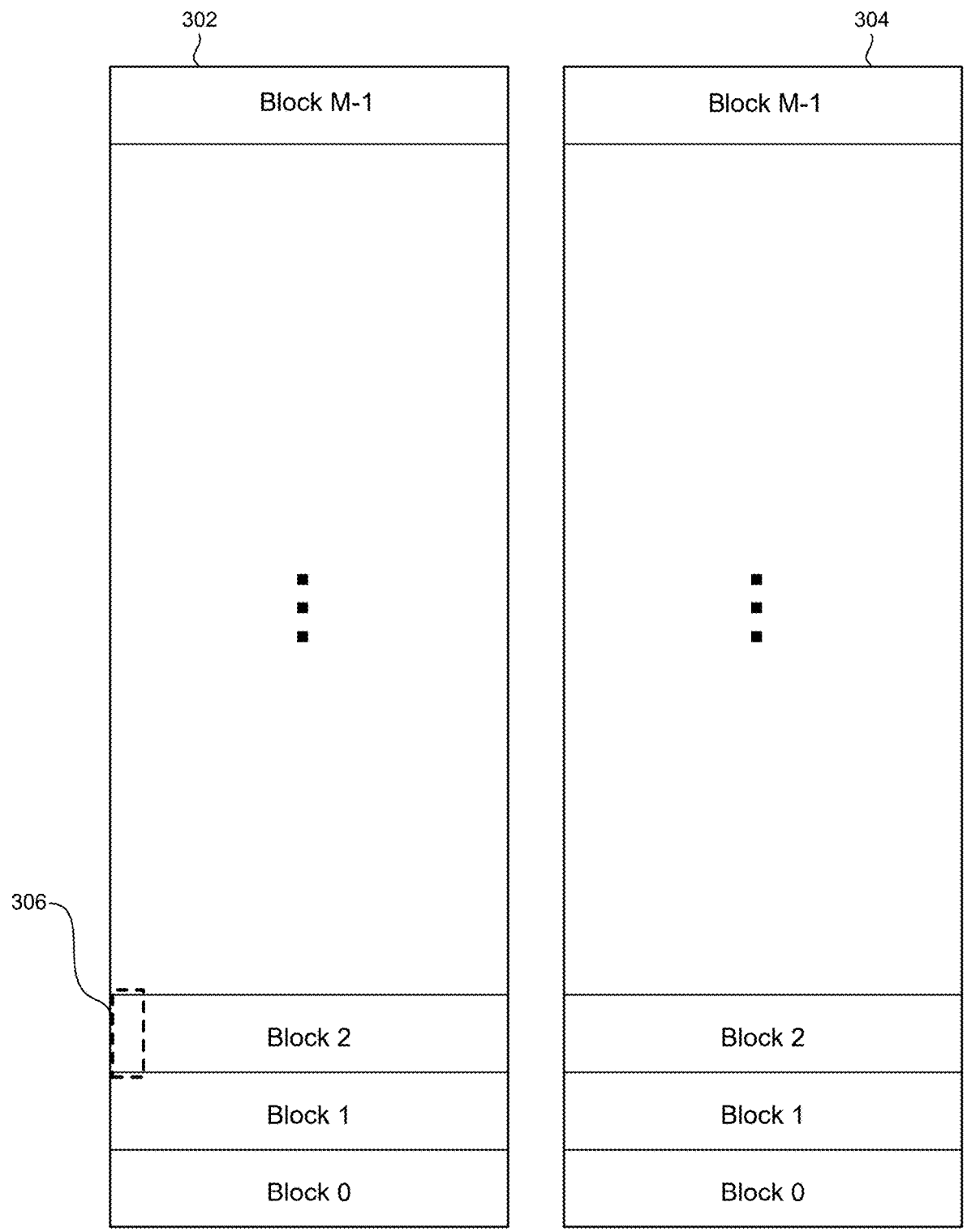
FIGS. 4A-G illustrate an example of a memory structure.

FIG. 4A is a block diagram explaining one example organization of memory structure 202, which is divided into two planes 302 and 304. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, memory cells can be grouped into blocks for other reasons, such as to organize the memory structure 202 to enable the signaling and selection circuits. In some embodiments, a block represents a groups of connected memory cells as the memory cells of a block share a common set of word lines.

Figure 4B:
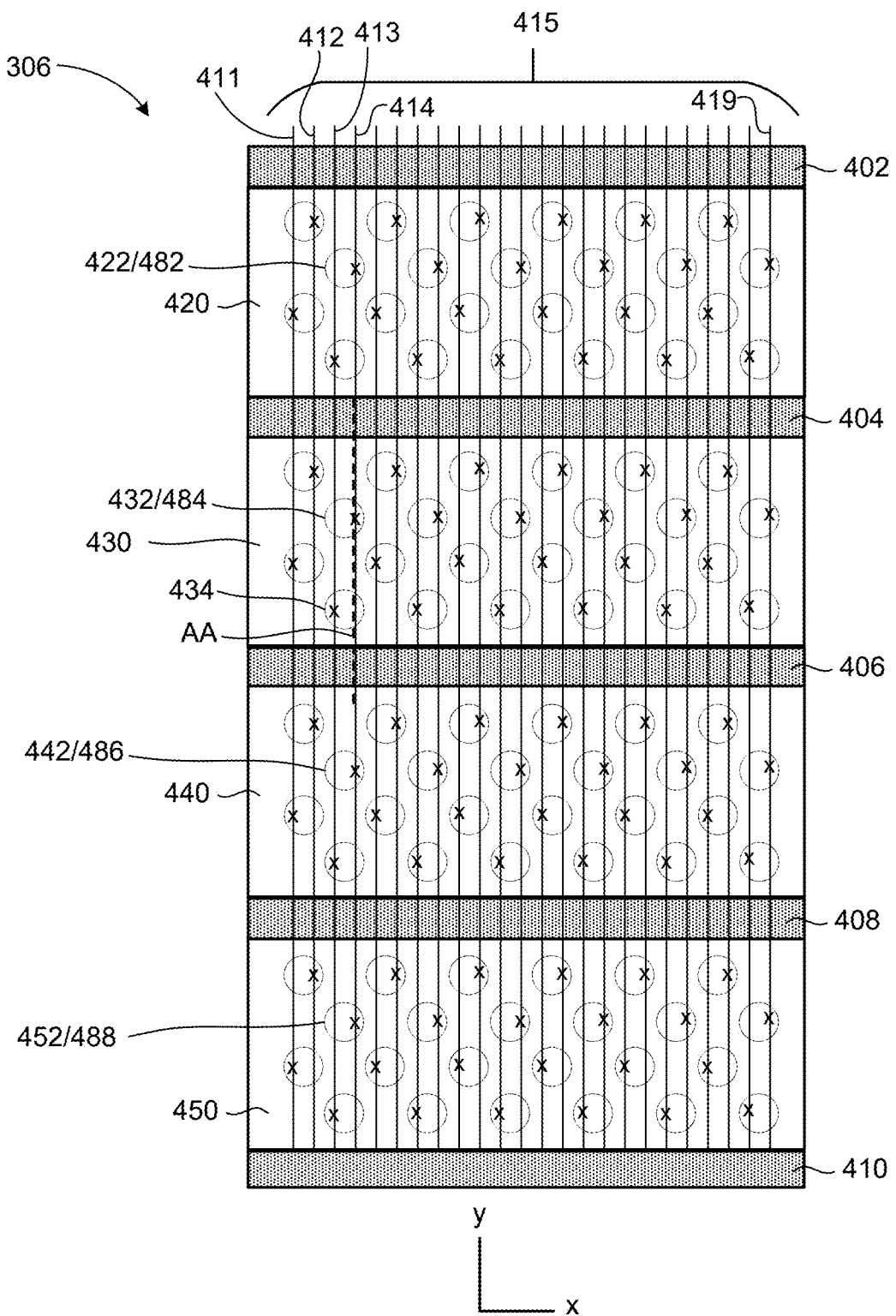

FIGS. 4B-4F depict an example three dimensional ("3D") NAND structure that corresponds to the structure of FIG. 3 and can be used to implement memory structure 202 of FIG. 2A or 2B. FIG. 4B is a block diagram depicting a top view of a portion of one block from memory structure 202. The portion of the block depicted in FIG. 4B corresponds to portion 306 in block 2 of FIG. 4A. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends beyond the portion shown, the block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as word line fingers that are separated by the local interconnects. In one embodiment, the word line fingers on a common level of a block connect together to form a single word line. In another embodiment, the word line fingers on the same level are not connected together. In one example implementation, a bit line only connects to one vertical column in each of regions 420, 430, 440 and 450. In that implementation, each block has sixteen rows of active columns and each bit line connects to four rows in each block. In one embodiment, all of four rows connected to a common bit line are connected to the same word line (via different word line fingers on the same level that are connected together); therefore, the system uses the source side selection lines and the drain side selection lines to choose one (or another subset) of the four to be subjected to a memory operation (program, verify, read, and/or erase).

Although FIG. 4B shows each region having four rows of vertical columns, four regions and sixteen rows of vertical columns in a block, those exact numbers are an example implementation. Other embodiments may include more or less regions per block, more or less rows of vertical columns per region and more or less rows of vertical columns per block.

FIG. 4B also shows the vertical columns being staggered. In other embodiments, different patterns of staggering can be used. In some embodiments, the vertical columns are not staggered.

Figure 4C:
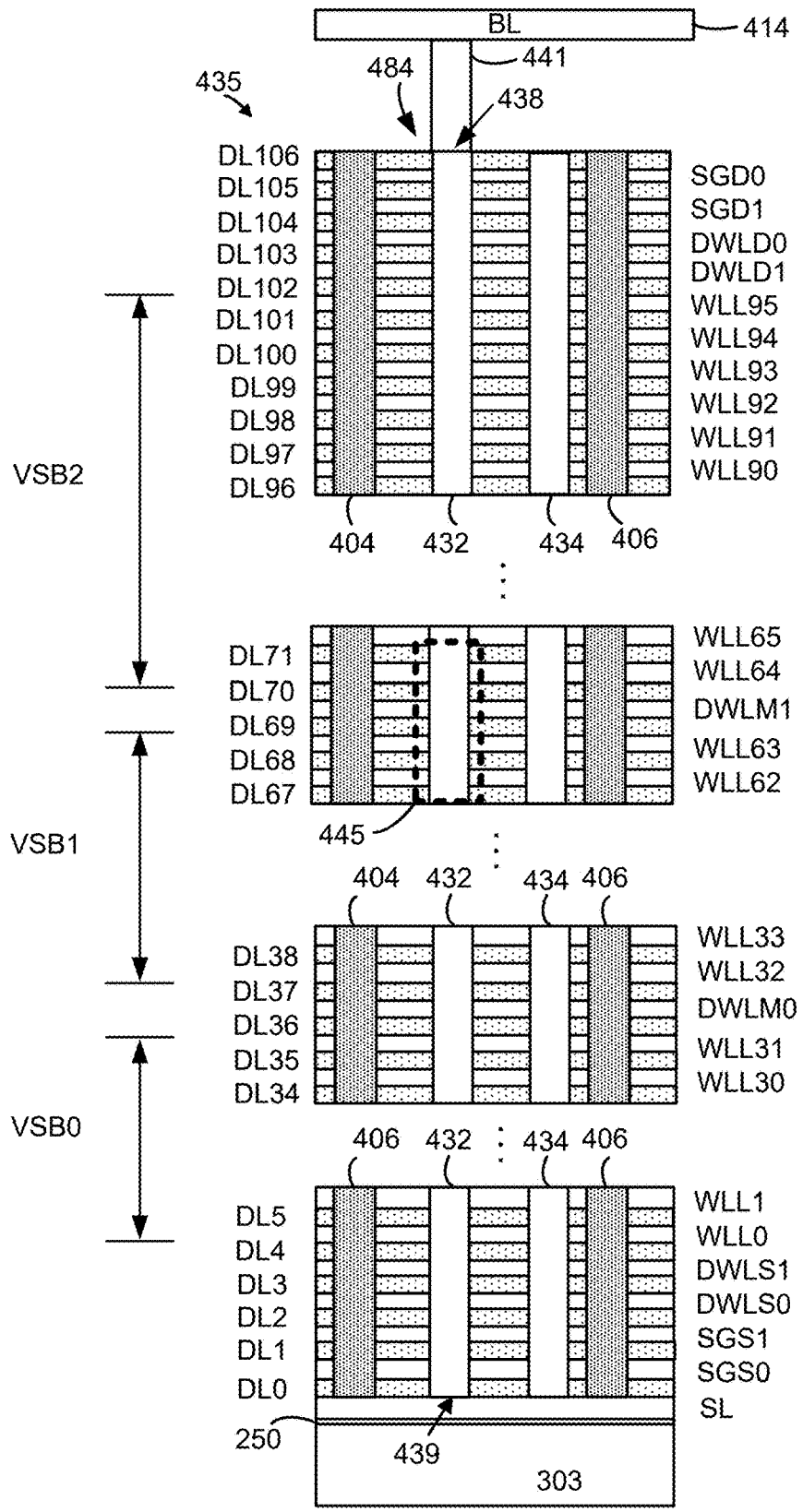

FIG. 4C depicts an embodiment of a stack 435 showing a cross-sectional view along line AA of FIG. 4B. Two SGD layers (SGD0, SDG1), two SGS layers (SGS0, SGS1) and six dummy word line layers DWLD0, DWLD1, DWLMI, DWLM0, DWLS0 and DWLS1 are provided, in addition to the data word line layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DL0-DL106.

Columns 432, 434 of memory cells are depicted in the multi-layer stack. The stack includes a substrate 303, an insulating film 250 on the substrate, and a portion of a source line SL. A portion of the bit line 414 is also depicted. Note that NAND string 484 is connected to the bit line 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bit line 414. The local interconnects 404 and 406 from FIG. 4B are also depicted.

The stack 435 is divided into three vertical sub-blocks (VSB0, VSB1, VSB2). Vertical sub-block VSB0 includes WLL0-WLL31. The following layers could also be considered to be a part of vertical sub-block VSB0 (SGS0, SGS1, DWLS0, DWLS1). Vertical sub-block VSB1 includes WLL32-WLL63. Vertical sub-block VSB2 includes WLL64-WLL95. The following layers could also be considered to be a part of vertical sub-block VSB2 (SGD0, SGD1, DWLD0, DWLD1). Each NAND string has a set of data memory cells in each of the vertical sub-blocks. Dummy word line layer DMLM0 is between vertical sub-block VSB0 and vertical sub-block VSB1. Dummy word line layer DMLMI is between vertical sub-block VSB1 and vertical sub-block VSB2. The dummy word line layers have dummy memory cell transistors that may be used to electrically isolate a first set of memory cell transistors within the memory string (e.g., corresponding with vertical sub-block VSB0 word lines WLL0-WLL31) from a second set of memory cell transistors within the memory string (e.g., corresponding with the vertical sub-block VSB1 word lines WLL32-WLL63) during a memory operation (e.g., an erase operation or a programming operation).

Figure 4D:
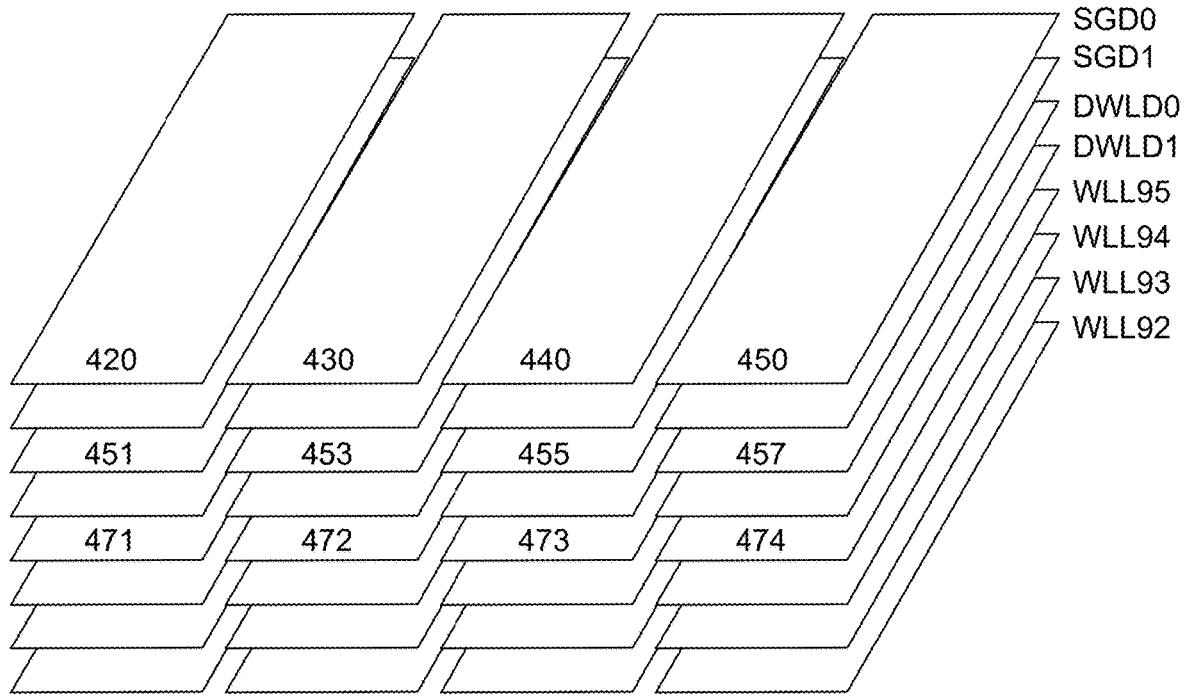
Figure 4D:
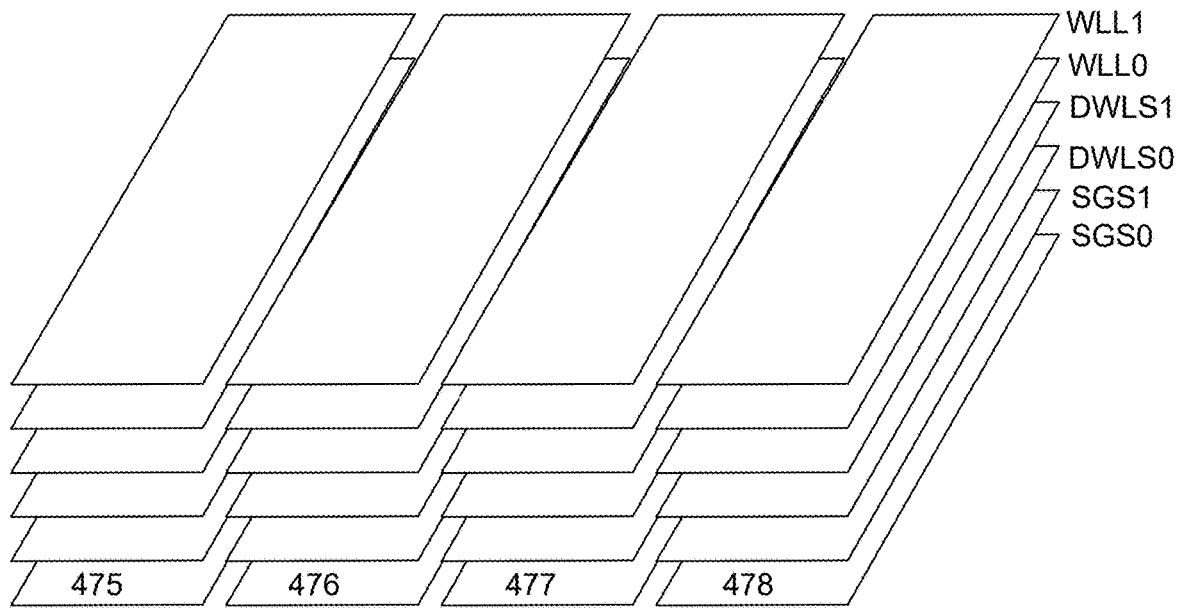

FIG. 4D depicts an alternative view of the SG layers and word line layers of the stack 435 of FIG. 4C. The SGD layers SGD0 and SGD0 (the drain-side SG layers) each includes parallel rows of SG lines associated with the drain-side of a set of NAND strings. For example, SGD0 includes drain-side SG regions 420, 430, 440 and 450, consistent with FIG. 4B.

Below the SGD layers are the drain-side dummy word line layers. Each dummy word line layer represents a word line, in one approach, and is connected to a set of dummy memory cells at a given height in the stack. For example, DWLD0 comprises word line layer regions 451, 453, 455 and 457. A dummy memory cell, also referred to as a non-data memory cell, does not store data and is ineligible to store data, while a data memory cell is eligible to store data. Moreover, the Vth of a dummy memory cell is generally fixed at the time of manufacture or may be periodically adjusted, while the Vth of the data memory cells changes more frequently, e.g., during erase and programming operations of the data memory cells.

Below the dummy word line layers are the data word line layers. For example, WLL95 comprises word line layer regions 471, 472, 473 and 474.

Below the data word line layers are the source-side dummy word line layers.

Below the source-side dummy word line layers are the SGS layers. The SGS layers SGS0 and SGS1 (the source-side SG layers) each includes parallel rows of SG lines associated with the source-side of a set of NAND strings. For example, SGS0 includes source-side SG lines 475, 476, 477 and 478. Each SG line can be independently controlled, in one approach. Or the SG lines can be connected and commonly controlled.

Figure 4E:
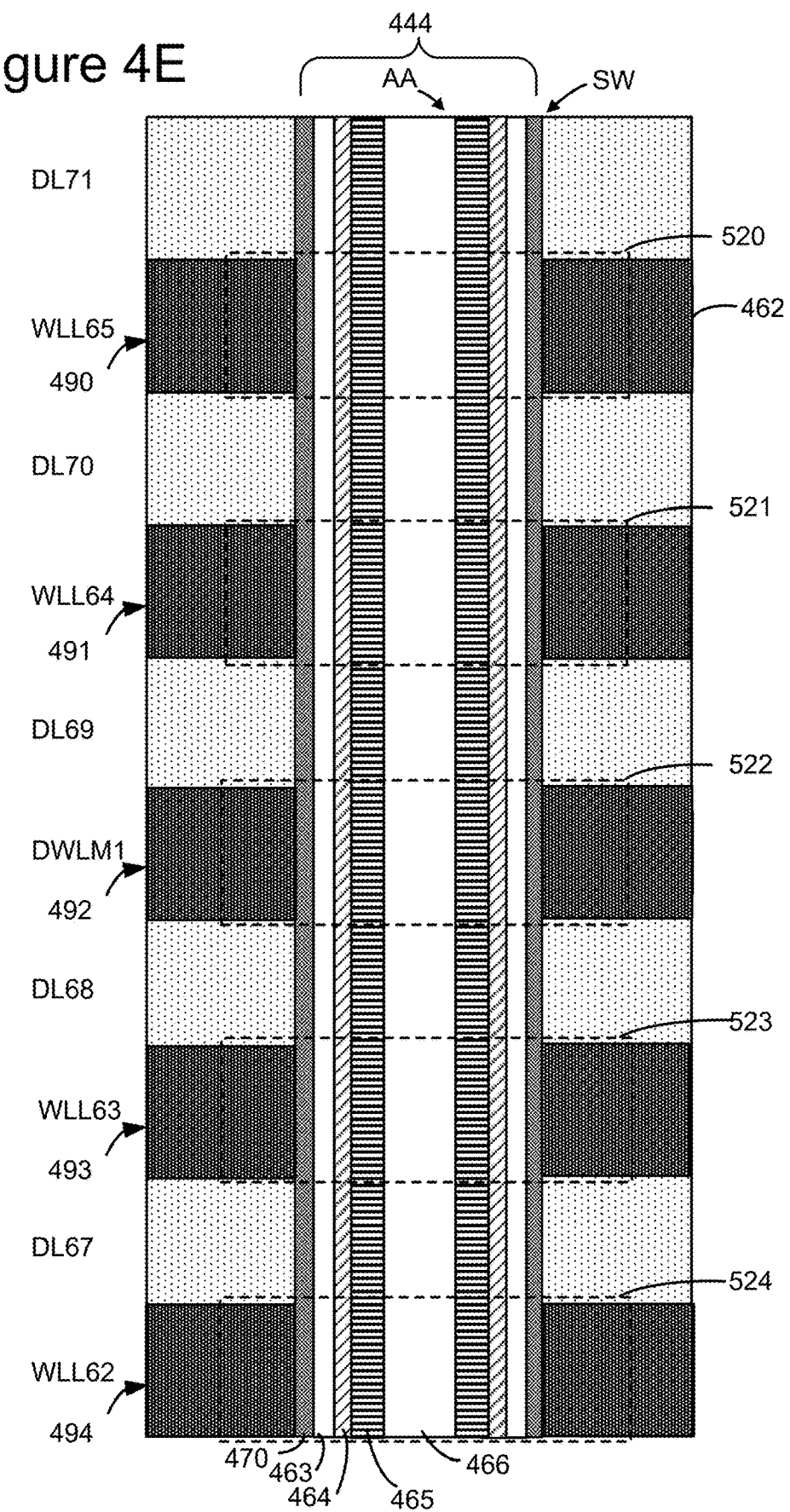

FIG. 4E depicts a view of the region 445 of FIG. 4C. Data memory cell transistors 520 and 521 are above dummy memory cell transistor 522. Below dummy memory cell transistor 522 are data memory cell transistors 523 and 524. A number of layers can be deposited along the sidewall (SW) of the memory hole 444 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Non-data transistors (e.g., select transistors, dummy memory cell transistors) may also include the charge trapping layer 463. In FIG. 4E, dummy memory cell transistor 522 includes the charge trapping layer 463. Thus, the threshold voltage of at least some non-data transistors may also be adjusted by storing or removing electrons from the charge trapping layer 463. It is not required that all non-data transistors have an adjustable Vth. For example, the charge trapping layer 463 is not required to be present in every select transistor.

Each of the memory holes can be filled with a plurality of annular layers comprising a blocking oxide layer, a charge trapping layer, a tunneling layer and a channel layer. A core region of each of the memory holes is filled with a body material, and the plurality of annular layers are between the core region and the WLLs in each of the memory holes.

In some cases, the tunneling layer 464 can comprise multiple layers such as in an oxide-nitride-oxide configuration.

Figure 4F:
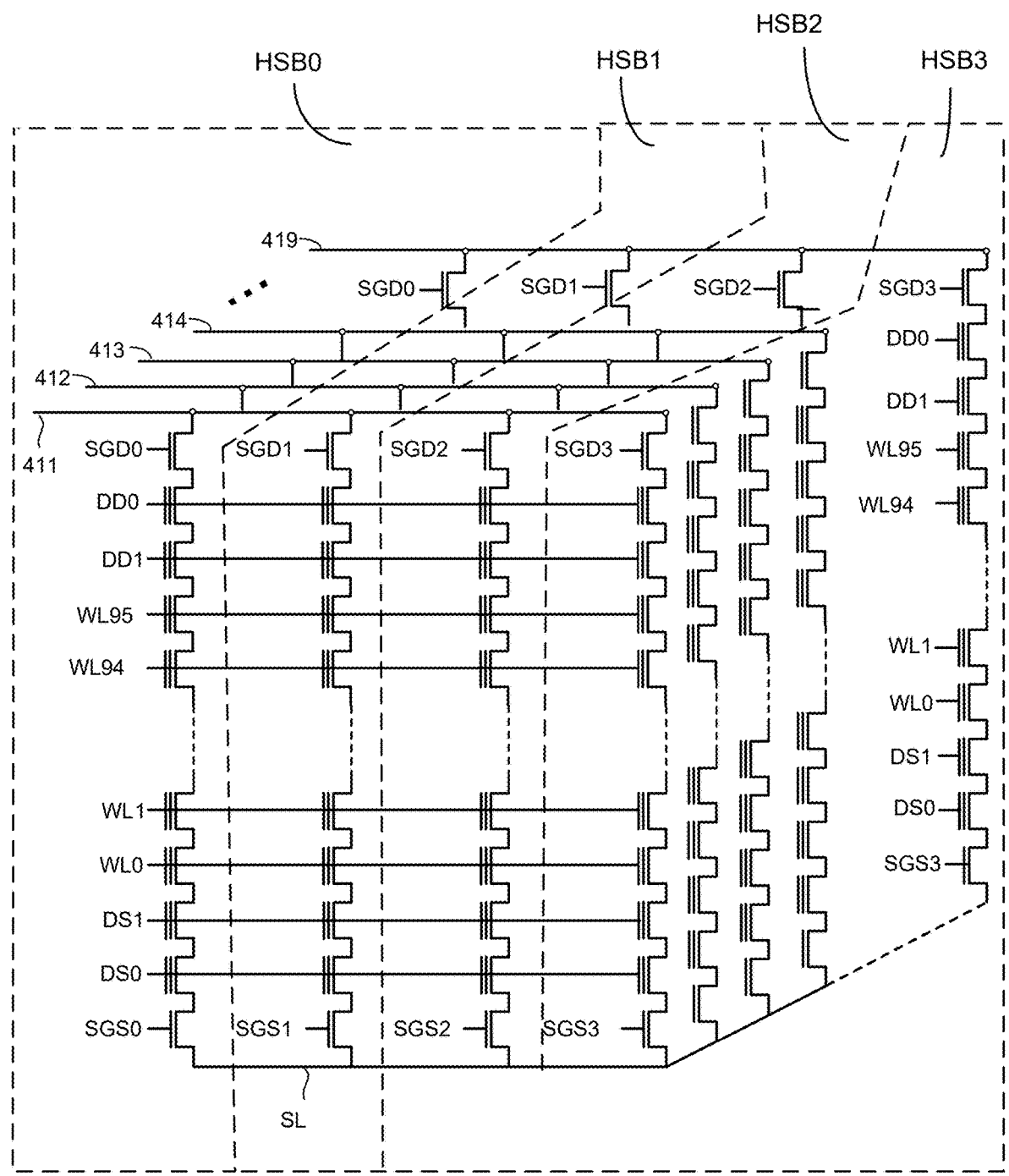

FIG. 4F is a schematic diagram of a portion of the memory depicted in in FIGS. 3-4E. FIG. 4F shows physical word lines WLL0-WLL95 running across the entire block. The structure of FIG. 4F corresponds to portion 306 in Block 2 of FIGS. 4A-E, including bit lines 411, 412, 413, 414, . . . 419. Within the block, each bit line is connected to four NAND strings. Drain side selection lines SGD0, SGD1, SGD2 and SGD3 are used to determine which of the four NAND strings connect to the associated bit line(s). Source side selection lines SGS0, SGS1, SGS2 and SGS3 are used to determine which of the four NAND strings connect to the common source line. The block can also be thought of as divided into four horizontal sub-blocks HSB0, HSB1, HSB2 and HSB3. Horizontal sub-block HSB0 corresponds to those vertical NAND strings controlled by SGD0 and SGS0, Horizontal sub-block HSB1 corresponds to those vertical NAND strings controlled by SGD1 and SGS1, Horizontal sub-block HSB2 corresponds to those vertical NAND strings controlled by SGD2 and SGS2, and Horizontal sub-block HSB3 corresponds to those vertical NAND strings controlled by SGD3 and SGS3.

Figure 4G:
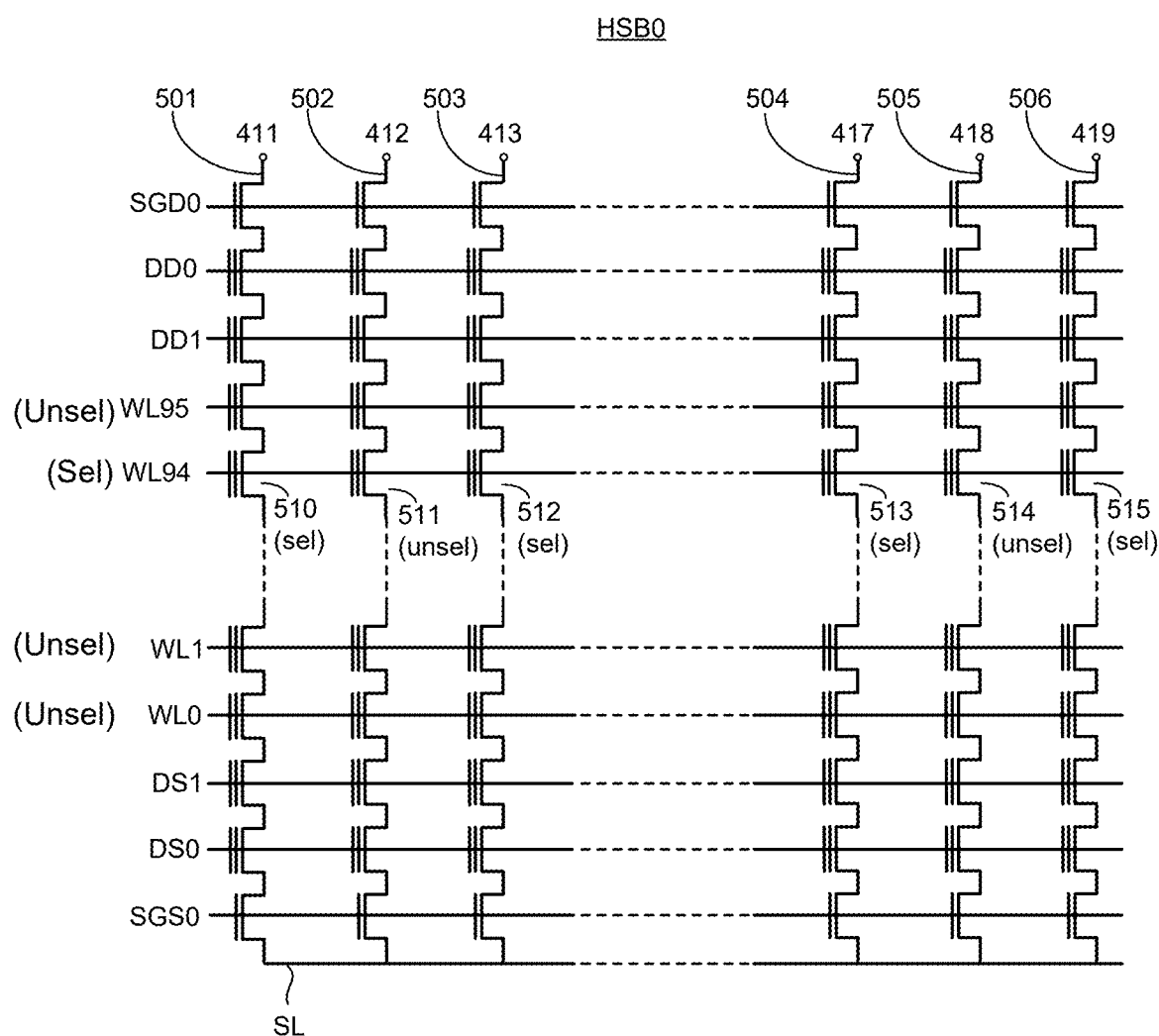

FIG. 4G is a schematic of horizontal sub-block HSB0. Horizontal sub-blocks HSB1, HSB2 and HSB3 have similar structures. FIG. 4G shows physical word lines WL0-WL95 running across the entire sub-block S0. All of the NAND strings of sub-block S0 are connected to SGD0 and SGS0. FIG. 4G only depicts six NAND stings 501, 502, 503, 504, 505 and 506; however, horizontal sub-block HSB0 will have thousands of NAND strings (e.g., 15,000 or more).

FIG. 4G is being used to explain the concept of a selected memory cell. A memory operation is an operation designed to use the memory for its purpose and includes one or more of reading data, writing/programming data, erasing memory cells, refreshing data in memory cells, and the like. During any given memory operation, a subset of the memory cells will be identified to be subjected to one or more parts of the memory operation. These memory cells identified to be subjected to the memory operation are referred to as selected memory cells. Memory cells that have not been identified to be subjected to the memory operation are referred to as unselected memory cells. Depending on the memory architecture, the memory type, and the memory operation, unselected memory cells may be actively or passively excluded from being subjected to the memory operation.

As an example of selected memory cells and unselected memory cells, during a programming process, the set of memory cells intended to take on a new electrical characteristic (or other characteristic) to reflect a changed programming state are referred to as the selected memory cells while the memory cells that are not intended to take on a new electrical characteristic (or other characteristic) to reflect a changed programming state are referred to as the unselected memory cells. In certain situations, unselected memory cells may be connected to the same word line as selected memory cells. Unselected memory cells may also be connected to different word lines than selected memory cells. Similarly, during a reading process, the set of memory cells to be read are referred to as the selected memory cells while the memory cells that are not intended to be read are referred to as the unselected memory cells.

To better understand the concept of selected memory cells and unselected memory cells, assume a programming operation is to be performed and, for example purposes only, that word line WL94 and horizontal sub-block HSB0 are selected for programming (see FIG. 4G). That means that all of the memory cells connected to WL94 that are in horizontal sub-blocks HSB1, HSB2 and HSB3 (the other horizontal sub-blocks) are unselected memory cells. Some of the memory cells connected to WL94 in horizontal sub-block HS0 are selected memory cells and some of the memory cells connected to WL94 in horizontal sub-block HS0 are unselected memory cells depending on how the programming operation is performed and the data pattern being programmed. For example, those memory cells that are to remain in the erased state S0 will be unselected memory cells, because their programming state will not change in order to store the desired data pattern, while those memory cells that are intended to take on a new electrical characteristic (or other characteristic) to reflect a changed programming state (e.g., programmed to states S1-S7) are selected memory cells. Looking at FIG. 4G, assume for example purposes, that memory cells 511 and 514 (which are connected to word line WL94) are to remain in the erased state; therefore, memory cells 511 and 514 are unselected memory cells (labeled "unsel" in FIG. 4G). Additionally, assume for example purposes that memory cells 510, 512, 513 and 515 (which are connected to word line WL94) are to be programmed to any of the data states S1-S7; therefore, memory cells 510, 512, 513 and 515 are selected memory cells (labeled "sel" in FIG. 4G). While some memory cells along WL94 may be considered unselected memory cells because they are to remain in the erased state, WL94 may be considered as a "selected word line" in this scenario because selected memory cells 510, 512, 513 and 515 are connected to WL94 and are accessed via WL94.

Although the example memory system of FIGS. 3-4G is a three dimensional memory structure that includes vertical NAND strings with charge-trapping material, other (2D and 3D) memory structures can also be used with the technology described herein. Different operations for accessing data in nonvolatile memory cells (e.g., read, program, program verify) that are described below may be applied to one or more of the example memory systems described above with respect to FIGS. 3-4G.

Typically, the program voltage applied to the control gates (via a selected word line) during a program operation is applied as a series of program pulses. Between program pulses are a set of verify pulses to perform verification. In many implementations, the magnitude of the program pulses is increased with each successive pulse by a predetermined step size.

In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. For example, when data is written to a set of memory cells, some of the memory cells will need to store data associated with an erased state so they will not be programmed. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming.

Figure 5A:
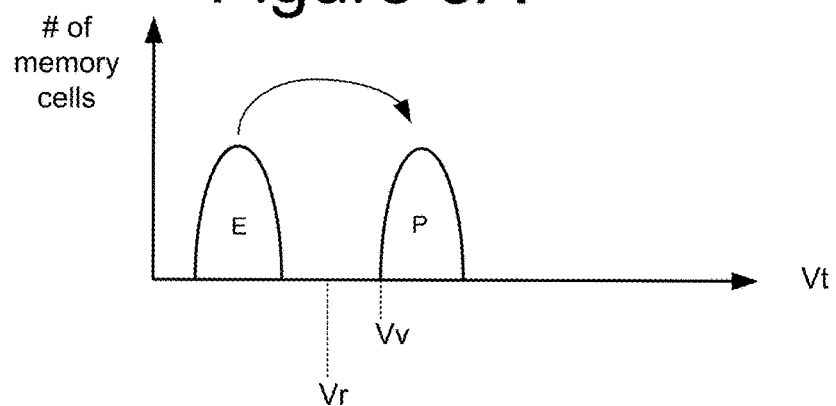
FIGS. 5A-C show threshold voltage distributions.

Memory cells in a memory system may be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, which illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine whether a memory cells is erased (state E) or programmed (state P). FIG. 5A also depicts verify reference voltage Vv. In some embodiments, when programming memory cells to data state P, the system will test whether those memory cells have a threshold voltage greater than or equal to Vv in a program-verify (or "verify") operation. In some embodiments, verify is not performed during SLC programming.

Memory cells that are configured to store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores three bits of data. Other embodiments may use other data capacities per memory cell (e.g., such as two, four, or five bits of data per memory cell). Memory cells may be configured for SLC or MLC storage of data. In some cases, a block of nonvolatile memory cells may be configured for SLC data storage at one time and configured for MLC data storage at another time.

Figure 5B:
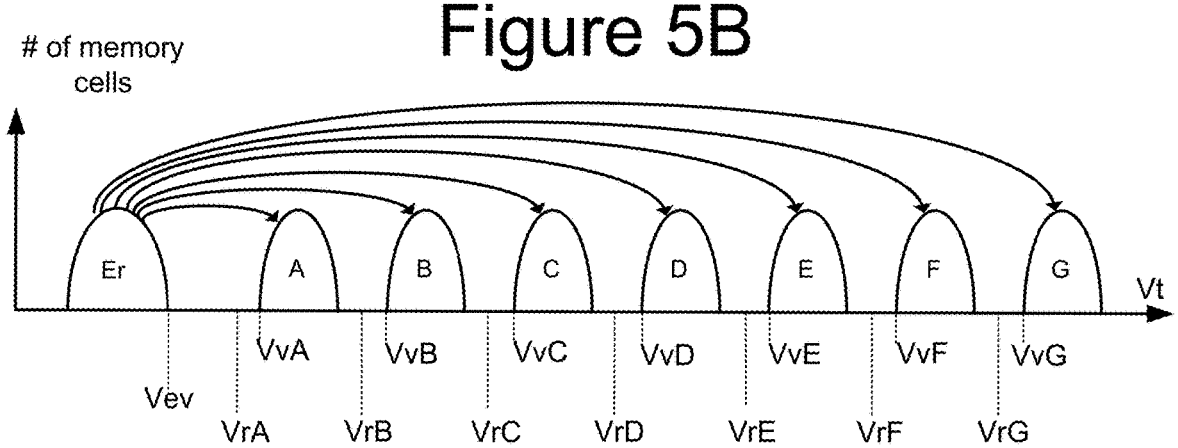

FIG. 5B shows eight threshold voltage distributions, corresponding to eight data states that stores three bits per cell. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5B also shows a number of verify reference voltages. The verify voltages are VvA, VvB, VvC, VvD, VvE, VvF, and VvG. In some embodiments, when programming memory cells to data state A, the system will test whether those memory cells have a threshold voltage greater than or equal to VvA. If the memory cell has a threshold voltage greater than or equal to VvA, then the memory cell is inhibited (locked out) from further programming. Similar reasoning applies to the other data states.

Figure 5C:
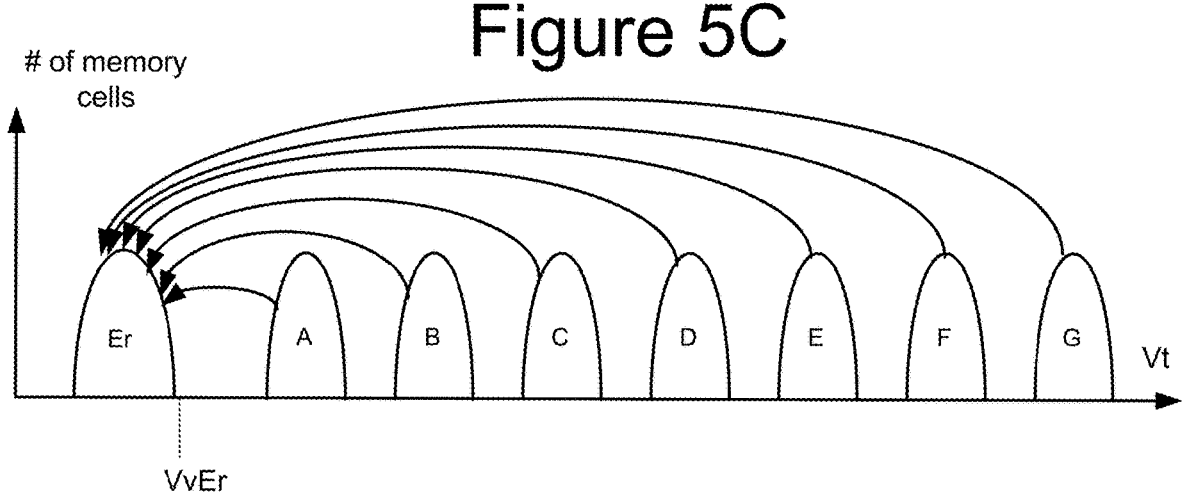

FIG. 5C shows an example of an erase operation directed to a memory with eight threshold voltage distributions, corresponding to eight data states that stores three bits per cell as in FIG. 5B. In an erase operation, threshold voltages of memory cells in data states A-G have their threshold voltages reduced sufficiently so that the memory cells are in the Er state (e.g., threshold voltages verified as less than VvEr). While programming (writing) memory cells may be performed for relatively small units (e.g., page or word line), erase may be performed for larger units (e.g., a block).

In some cases, defects may occur in nonvolatile memory structures (e.g., memory structure 202, implemented as described with respect to FIGS. 3-4G). Such defects may be formed during fabrication. Defects may be detected during initial testing or may manifest later during use. Defects may affect a single cell, multiple cells or larger units such as a word line, bit line or a block. A defect that affect a block may be particularly significant in a memory structure that has large blocks. In a memory structure in which memory cells are connected in series (e.g., in NAND strings), one memory cell may affect memory cells that are connected in series.

One example of a defect that may affect a substantial portion of a memory structure is a defective word line. For example, in some cases, a word line may be short-circuited so that it is difficult or impossible to apply a desired voltage on the short-circuited word line (e.g., a word line may be electrically connected or shorted to another component that has a fixed voltage that prevents control of the voltage of the short-circuited word line. Such a defect may affect all cells that are coupled to the short-circuited word line. In addition, memory cells that are connected in series with directly affected memory cells (memory cells coupled to the short-circuited word line) may be affected.

Figure 6:
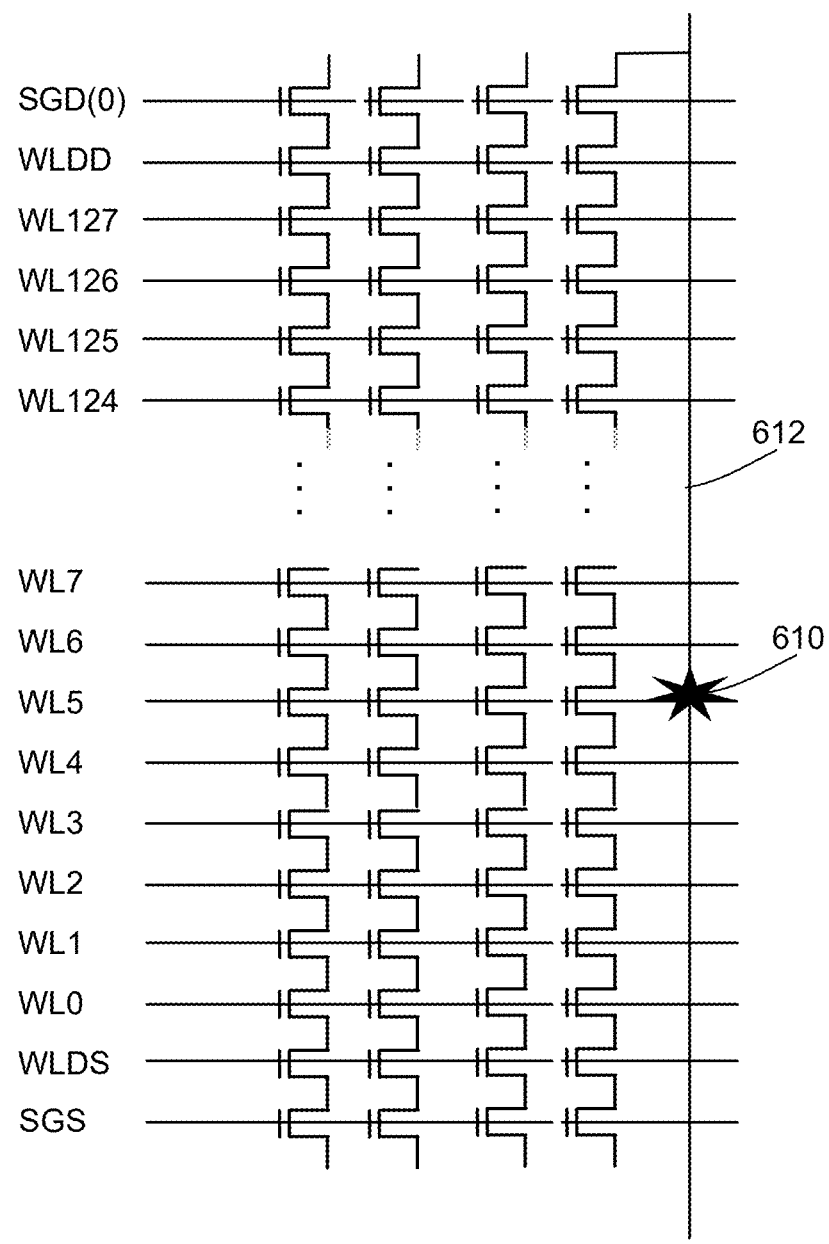
FIG. 6 shows an example of a defective word line.

FIG. 6 shows an example of word lines, WL0-WL127, that are coupled to NAND strings (e.g., in memory structure 202). In this example, WL5 is defective because a defect 610 (e.g., a portion of debris, metal or other foreign material, a patterning defect or other defect) electrically connects WL5 with line 612. Such a defect may affect the voltage that may be applied to WL5, which may impact read and/or write operations. For example, an electrical connection formed by defect 610 may cause WL5 to remain at substantially the same voltage as line 612 during read and/or write operations that are directed to memory cells of any of WL0-WL127 (not only defective WL5), which may cause such operations to fail as illustrated by examples below. Because memory cells of WL0-WL127 are affected, a substantial amount of data may be lost if such a defect manifests during use. For example, an entire block may be affected and any data previously programmed in the block may be lost.

FIG. 7A depicts a voltage signal that includes a plurality of pulses applied to control gates of nonvolatile memory cells (e.g., applied to a word line such as any of WL0-WL127) in an example program operation. The horizontal axis denotes a pulse number, ranging from 1-22, and the vertical axis denotes program voltage. During a program operation, program loops are performed for a selected word line in a selected block in each plane. A program loop comprises a program portion in which a program pulse at a corresponding program voltage is applied to the selected word line followed by a verify portion in which a verify signal is applied to the selected word line while one or more verify tests are performed for the associated memory cells. Other than the erased state, each assigned state has a verify voltage which is used in the verify test for the state in a program operation.

The voltage signal 700 includes a series of program pulses at different program voltages, including an initial program pulse 701, which are applied to a word line selected for programming. In this example, the voltage signal includes program pulses having corresponding program voltages which increase stepwise in amplitude program loops of a programming pass using a fixed or varying step size. This is referred to as incremental step pulse programming, where the program voltage starts with an initial program pulse 701 at an initial level Vpgm_int and increases in a step in each successive program loop, for instance, until the program operation is completed. A successful completion occurs when the threshold voltages of the selected memory cells reach the verify voltages of the assigned data states.

The verify signal in each program loop, including example verify signal 702, can include one or more verify voltages, based on the assigned data states which are being verified for the program loop. The verify tests can encompass lower assigned data states and then midrange assigned data states and then higher assigned data states as the program operations proceeds. The example verify signals depict three verify voltages as a simplification.

All memory cells may initially be in the erased state (Er) at the beginning of the program operation, for instance. After the program operation is completed, the data can be read from the memory cells using read voltages which are between the Vth distributions. At the same time, a read pass voltage, Vpass (e.g., 8-10 V), also referred to as pass voltage, is applied to the remaining word lines. By testing whether the Vth of a given memory cell is above or below one or more of the read reference voltages, the system can determine the data state which is represented by a memory cell (e.g., VrA to VrG of FIG. 5B).

Figure 7B:
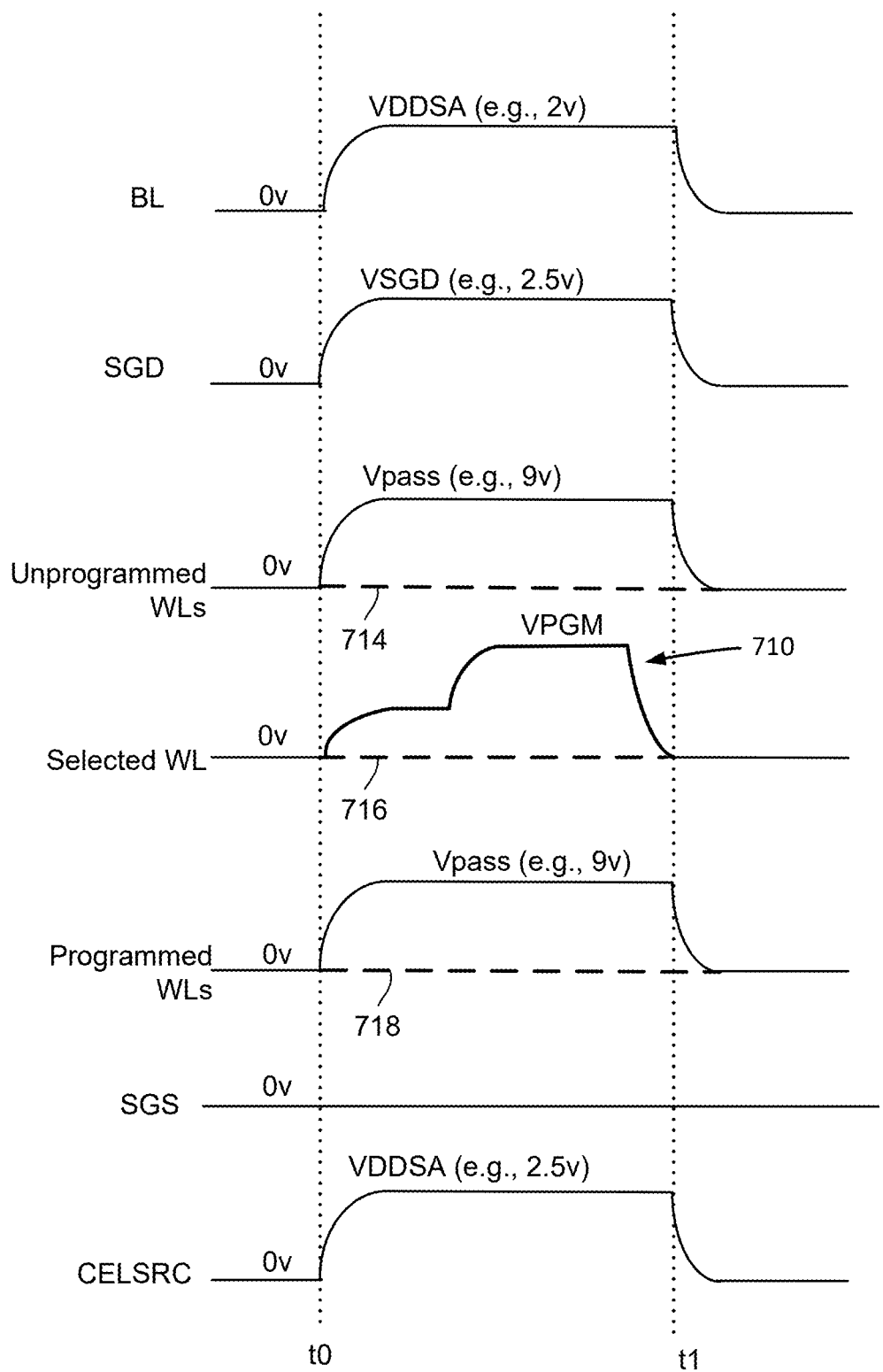

FIG. 7B shows an example of voltages on various component of a NAND structure (e.g., memory structure 202 as illustrated in the examples of FIGS. 3-4G) during a portion of a program operation (e.g., program operation illustrated in FIG. 7A). FIG. 7B shows an example of a single program pulse 710 (e.g., any pulse of voltage signal 700 shown in FIG. 7A) and the voltages associated with applying program pulse 710. The horizontal axis represents time with each trace labeled according to the component on which the corresponding voltage is applied (voltage increasing in the vertical direction). At time t0, voltages are ramped up from 0 volts to various target voltages. For example, bit line ("BL") voltage ramps up from 0 volts to VDDSA (e.g., 2V). Select Gate Drain ("SGD") voltage ramps up from 0 volts to VSGD (e.g., 2.5V) to turn SGD transistors on (conductive). Unprogrammed and programmed word line ("WL") voltages ramp up from 0 volts to a pass voltage, Vpass (e.g., 9V), to make corresponding channels conductive. Selected WL voltage ramps up from 0 volts to a program voltage, VPGM for program pulse 710 (e.g., Vpgm_int, or another program voltage shown in FIG. 6) to cause programming. Select Gate Source ("SGS") voltage is maintained at 0 volts to maintain SGS transistors off (nonconductive). Source voltage ("CELSRC") ramps up from 0 volts to VDDSA (e.g., 2.5 volts).

Subsequently, at time t1, voltages ramp down (in other examples, different components may ramp down at different times). FIG. 7B illustrates voltages that may result from a defect such as defect 610, which causes a short-circuit between a word line and another component. When the defective word line is an unprogrammed word line, the resulting voltage on the unprogrammed word line may be as shown by dashed line 714. For example, where a short-circuit connects an unselected word line to a line that is at or near zero volts, the voltage on the defective word line may remain at or near zero volts and may not rise to Vpass. When the defective word line is the selected word line, the resulting voltage on the selected word line may be as shown by dashed line 716. For example, where a short-circuit connects the selected word line to a line that is at or near zero volts, the voltage on the defective word line may remain at or near zero volts and may not rise to VPGM, which may result in a program failure (e.g., failure to program user data at a specified location). When the defective word line is a programmed word line, the resulting voltage on the unprogrammed word line may be as shown by dashed line 718. For example, where a short-circuit connects a selected word line to a line that is at or near zero volts, the voltage on the defective word line may remain at or near zero volts and may not rise to Vpass. While the examples shown by dashed lines 714, 716 and 718 indicate a voltage of zero volts, in some cases memory operations may be impacted even when some voltage is applied (e.g., where unselected word lines reach some voltage between zero and Vpass or where a selected word line reaches some voltage between zero and VPGM.

When the selected word line is defective or a programmed word line is defective (e.g., as illustrated in FIG. 7B), a program failure may result. For example, if voltage on the selected word line cannot be raised to VPGM, then programming does not occur and the program operation fails. If voltage on a programmed word line cannot be raised to Vpass, then at least some programmed memory cells (e.g., programmed to higher threshold voltage ranges corresponding to higher data states) may remain off (channel is nonconductive), which may affect program and program verify.

Figure 7C:
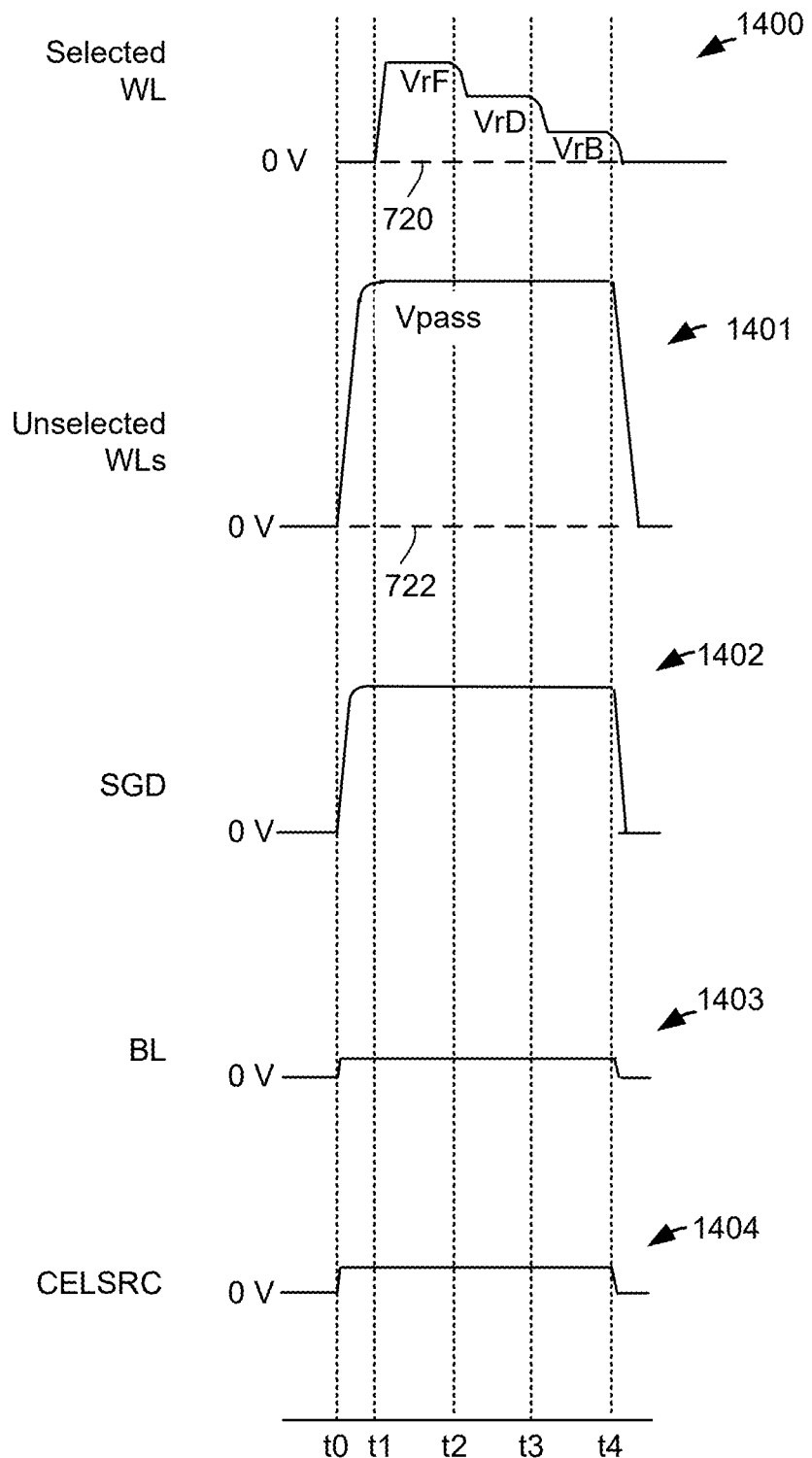

FIG. 7C shows an example of a read operation that may be affected by a defective word line (e.g., WL5, which is shorted by defect 610). FIG. 7C shows voltages (plots 1400-1404) on various components of a memory structure (e.g., memory structure 202). The voltage 1400 depicts Vcgr, the voltage applied to control gates of the selected memory cells via the selected word line ("Selected WL") to perform reads at three different read voltages (e.g., to obtain one logical page of data). The selected WL voltage for reading is set to VrF, VrD and VrB. Sensing occurs during each value of the selected WL voltage to determine the data of the logical page. If the selected word line is defective (e.g., as shown in FIG. 6) then the selected WL voltage may not rise to VrF, VrD or VrB (e.g., voltage may remain at or near zero as indicated by dashed line 720) so that memory cells are not accurately read and a read failure occurs (e.g., data may be uncorrectable by ECC).

Voltage 1401 denotes the read pass voltages (Vpass) applied to the unselected word lines (e.g., WL0 to WLn−1 and WLn+1 to WL127). Unselected memory cells are turned on (channel made conductive) by applying Vpass, where Vpass is selected to be a sufficiently high voltage to turn on all memory cells, including memory cells with higher threshold voltages (e.g., in data states F and G). If an unselected word line is defective then the unselected word line voltage may not rise to Vpass (e.g., voltage may remain at or near zero as indicated by dashed line 722). This may result in at least some unselected memory cells remaining off (channels nonconductive). For example, memory cells that are programmed to at least some higher data states may remain off.

The drain-side select gate voltage, SGD, shown by voltage plot 1402 is set at a high level provided to selected SGD transistors (e.g., SGD0). BL 1403 denotes the bit line voltage applied on bit lines such as bit lines 411 to 419 and is set at a level such as 0.5 V as part of the sensing process. CELSRC 1404 denotes the source line voltage applied to SL and can be set at a small positive voltage, in one approach.

When at least a portion of a channel of a NAND string (e.g., portion coupled to a defective word line) is nonconductive because of a defective word line, all memory cells of the NAND string may be affected. A defective word line may cause some or all NAND strings connected to the defective word line to be unreadable and/or unprogrammable.

Figure 8A:
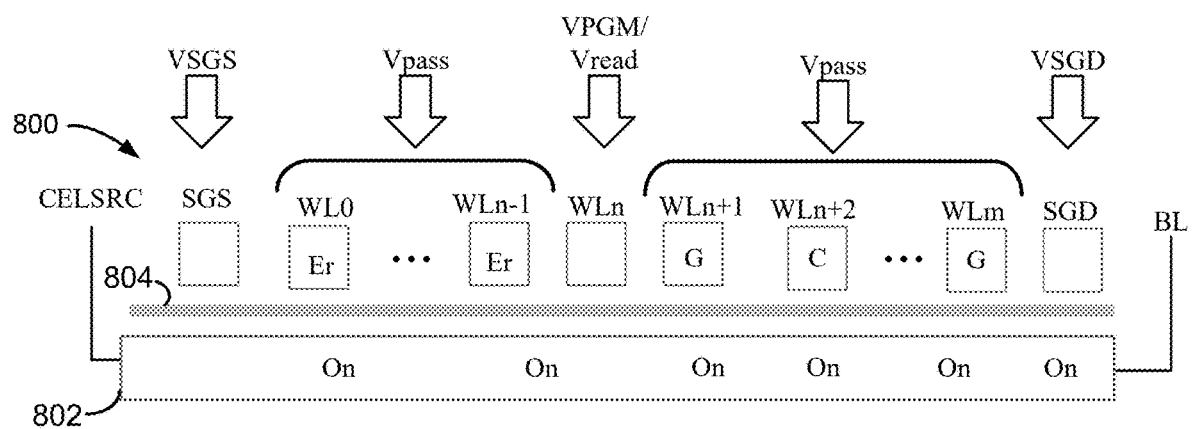
FIGS. 8A-B illustrate a NAND string with and without a defective word line.
Figure 8B:
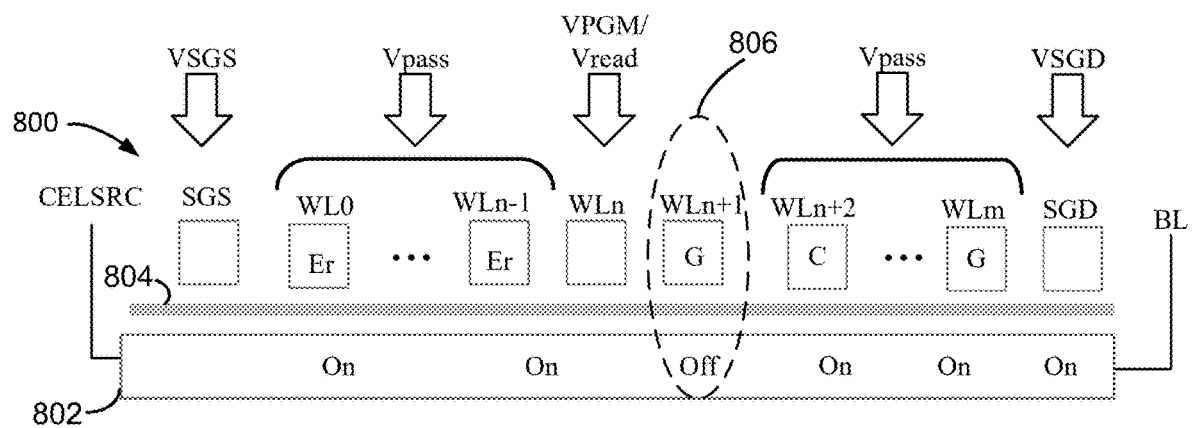

FIGS. 8A-B further illustrate possible effects of a defective (e.g., short-circuited) word line. FIG. 8A shows a NAND string 800 formed by word lines WL0 to WLm, select gates SGS and SGD, which are coupled to a channel 802. In FIG. 8A, memory cells along WLn are being programmed or read (e.g., WLn is the selected WL for a program operation with VPGM or a read operation with Vpass). FIG. 8A shows the voltages applied to different components while a programming pulse or read voltage is applied. While channel 802 may be turned off at SGS (e.g., VSGS=0 volts), channel 802 is otherwise on, or electrically conductive (e.g., unselected memory cells are turned on by Vpass, SGD is turned on by VSGD and the selected memory cell is turned on by VPGM for programming and may be turned on by Vread according to the data state and read voltage applied). Programming may occur at the time shown as the electric field between selected word line WLn and channel 802 causes electrons from channel 802 to move to charge-trapping layer 804 and become trapped there, which increases threshold voltage. Reading may occur as different read voltages are applied to determine the threshold voltage and corresponding data state of the memory cell.

FIG. 8B shows the situation where a previously programmed word line, WLn+1, is defective (e.g., short circuited so that its voltage is not raised to Vpass). Memory cell 806 which is coupled to WLn+1 is shown having data state G (a relatively high state associated with a high threshold voltage) so that it may require a relatively high control gate voltage to turn on. Other memory cells along NAND string 800 may be on. For example, unprogrammed memory cells of word lines WL0 to WLn−1 and programmed memory cells WLn+2 to WLm receive Vpass, which is sufficient to turn them on. The memory cell of WLm in NAND string 800 is shown having data state G and is turned on by Vpass. Other memory cells (not shown) between WLn+1 and WLm that are programmed to lower stages (e.g., Er to E) may also turn on with Vpass. Because programming proceeds from drain side to source side in this example (from WLm to WL0), memory cells along WL0 to WLn−1 remain in the erased state "Er" and remain on. While FIGS. 8A-B show Vpass being applied to all unselected word lines, in other examples, different pass voltages are used for different word lines (e.g., different for programmed and unprogrammed word lines, different for word lines adjacent to the selected word line and more distant word lines, different for read and write operations and/or other differences). The present technology is not limited to any particular scheme of pass voltages.

In some cases, memory cells in the erased (Er) state may be turned on by a voltage less than Vpass so that a defective word line connected to unprogrammed memory cells may not affect reading or writing and may not be detected. In some cases, the defective condition of WLn+1 may only become apparent after it is programmed and after memory cells of other word lines are programmed (e.g., WLm to WLn+2). In some cases, a word line may become defective after some time in use (e.g., defect may be latent for some time). A significant amount of data may be stored in a block prior to encountering a defective word line. In some cases, a defective word line may prevent recovery of such data. For example, attempting to read data from memory cells of WLn+1 to WLm in FIG. 8B may be prevented by being unable to raise WLn+1 to Vpass, which results in some or all memory cells of WLn+1 remaining off. When channel 802 is pinched off by memory cell 806 as shown, reading (e.g., by discharging through NAND strings such as NAND string 800) may not provide accurate data so that the stored data may be lost.

According to aspects of the present technology, when a read or write failure is encountered that might correspond to a defective word line (e.g., short-circuited word line), detection of a defective word line is initiated. If a defective word line is detected, then a single word line erase operation is performed, which does not require a high voltage on the defective word line and thus may be performed even with the defective word line at a low voltage (e.g., zero or near zero volts). Erasing the memory cells of the defective word line to bring them to the erased state (Er) enables the memory cells to be turned on without applying a pass voltage (e.g., threshold voltages of memory cells of the defective word line may be less than zero so that they are turned on with zero or near zero volts on the defective word line). With memory cells of the defective word line turned on in this way, channels may be made conductive to enable previously programmed memory cells along the NAND strings to be read.

In some cases, detection of a defective word line may be performed in response to one or more triggering events (e.g., read failure, write failure or other event). Detection may include multiple steps (e.g., to determine if a defective word line is probable and subsequently to identify which word line is defective. For example, in a first step, multiple programmed word lines may be checked to see if more than a predetermined number of word lines (e.g., two) are affected, which may indicate a defective word line (e.g., in FIG. 8B, WLn+1 is defective, which affects data in WLn+1 to WLm).

Figure 9:
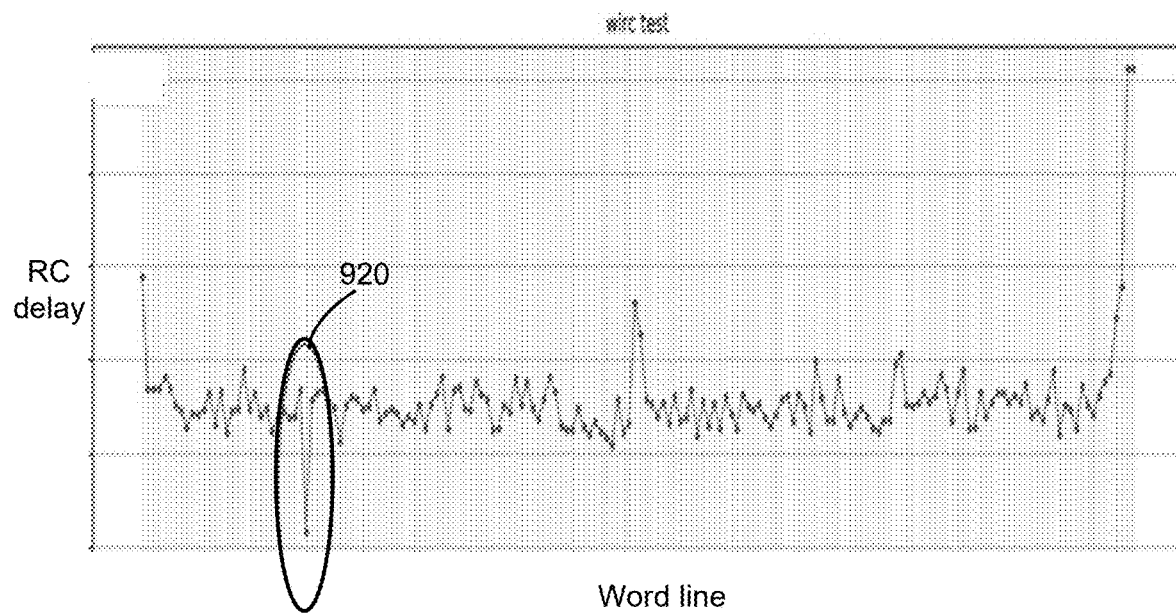
FIG. 9 illustrates an example of using RC delay to identify a defective word line.

If more than the predetermined number of word lines are defective then, in a second step, word lines may be tested to identify the defective word line. For example, the time to charge up (or discharge) word lines to a target level may be checked to see if there is a word line with time to charge or discharge outside an acceptable range (times depend on Resistance-Capacitance or RC delay). FIG. 9 shows an example of RC delay times for word lines of a block (e.g., time required to charge word lines connected to a plurality of NAND strings). RC delay testing may be performed in response to determining that more than a predetermined number of word lines in a block are unreadable (e.g., return data that is uncorrectable by ECC or UECC). A defective word line is identified by an RC delay time 920 that is significantly different from the mean discharge time, which indicates that the corresponding word line is short circuited. A word line that is identified as defective in this way may subsequently be subject to a single word line erase.

Figure 10:
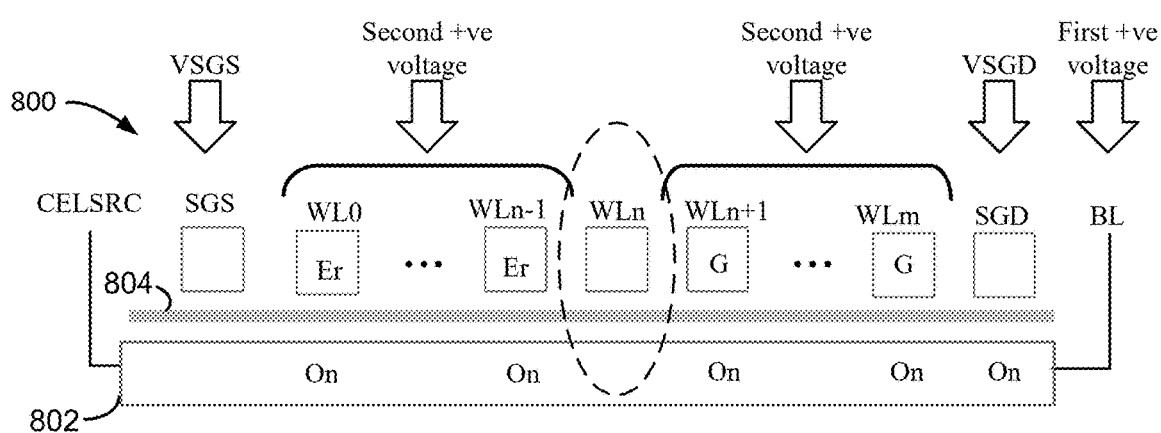
FIG. 10 illustrates an example of a single word line erase operation.

FIG. 10 shows an example of a single word line erase of a selected word line, WLn, according to an example. In this example, the selected word line (defective word line), WLn, remains at low voltage (e.g., zero volts) because it is short-circuited. A relatively high positive voltage (e.g., a voltage of 5 to 15 volts) is applied to channel 802 via the bit line (BL), with the drain select gate, SGD, turned on to create a first electric field between channel 802 and WLn. A second high positive voltage (e.g., a voltage of 5 to 15 volts) is applied to unselected (non-defective) word lines WL0 to WLn−1 and WLn+1 to WLm, which are coupled to channel 802 to boost channel voltage of channel 802 (e.g., select gates may be turned off to leave the channel electrically isolated (floating) and increase the first electric field. With a high positive voltage on channel 802 and a low voltage on WLn, a strong electric field (first electric field) is formed under WLn, which is sufficient to cause electrons to move from charge-trapping layer 804 to channel 802 (e.g., sufficient to cause erasing). In contrast, other word lines are at relatively high second positive voltage so that the electric field under the unselected word lines (second electric field) is weak and is insufficient to cause erasing so that little or no erasing occurs in the memory cells of the non-defective word lines. Thus, in a single word line erase, memory cells of a selected word line, WLn, (a defective word line in this example) are erased while memory cells of non-selected word lines (non-defective word lines in this example) are not erased.

At the end of the single word line erase operation illustrated in FIG. 10, all memory cells of defective word line WLn may be in the erased (Er) state so that their threshold voltages are low (e.g., negative threshold voltages) and the underlying portion of channel 802 is conductive. In this condition, data can be read from previously programmed memory cells of NAND string 800 (e.g., from memory cells of WLn+1 to WLm). In some cases, raw data read from these memory cells may have a high error rate so that data may be recovered from the raw data using one or more appropriate recovery technique. For example, in some data storage systems, data is subject to Exclusive OR (XOR) operations prior to storage, which allows recovery of a large amount of data. For example, where two or more pages of data are XORed to generate a page of XOR data, up to a page of corrupted data may be recovered by de-XORing one or more uncorrupted page and the page of XOR data to generate recovered data. Raw data that is read from WLn+1 to WLm may be subject to de-XOR operations to generate de-XORed data. For example, de-XOR operations may be applied to recover a page of data for which the raw data is uncorrectable by ECC (e.g., data stored along WLn, which is erased by a single word line erase operation).

Figure 11A:
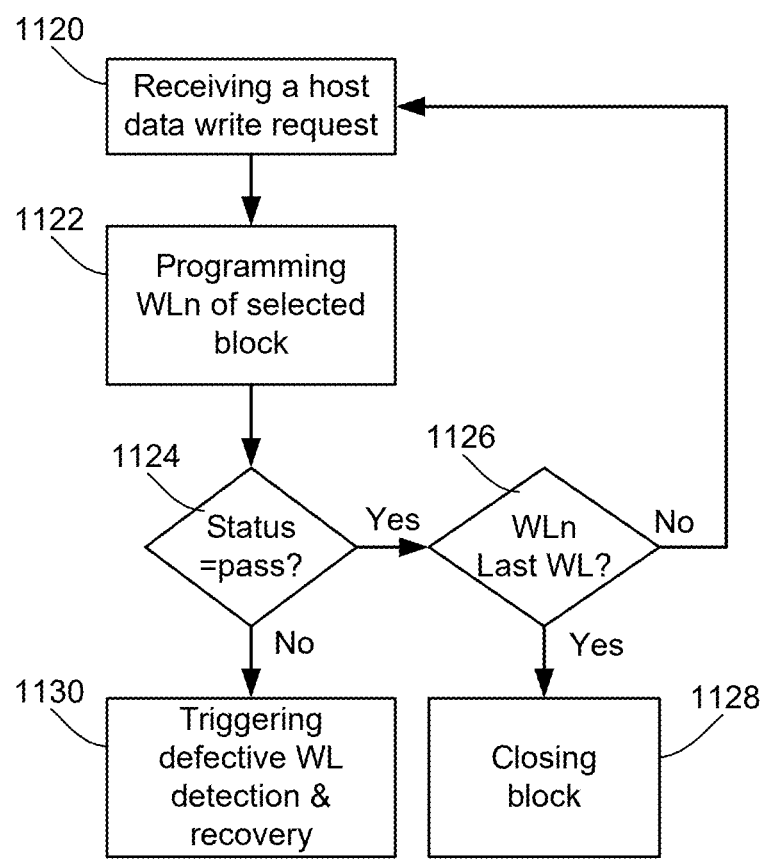
FIGS. 11A-C illustrate methods including defective WL detection and recovery.
Figure 11B:
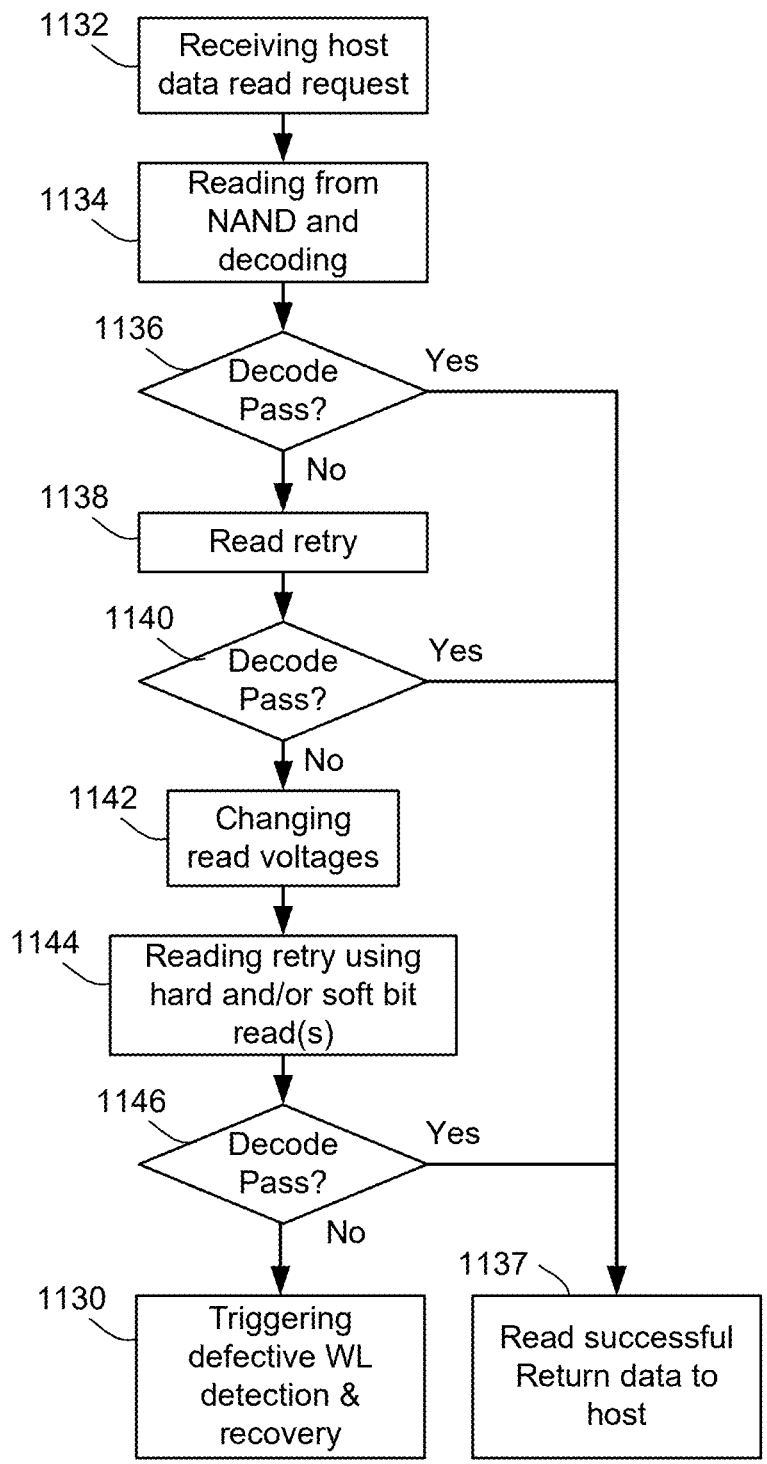
Figure 11C:
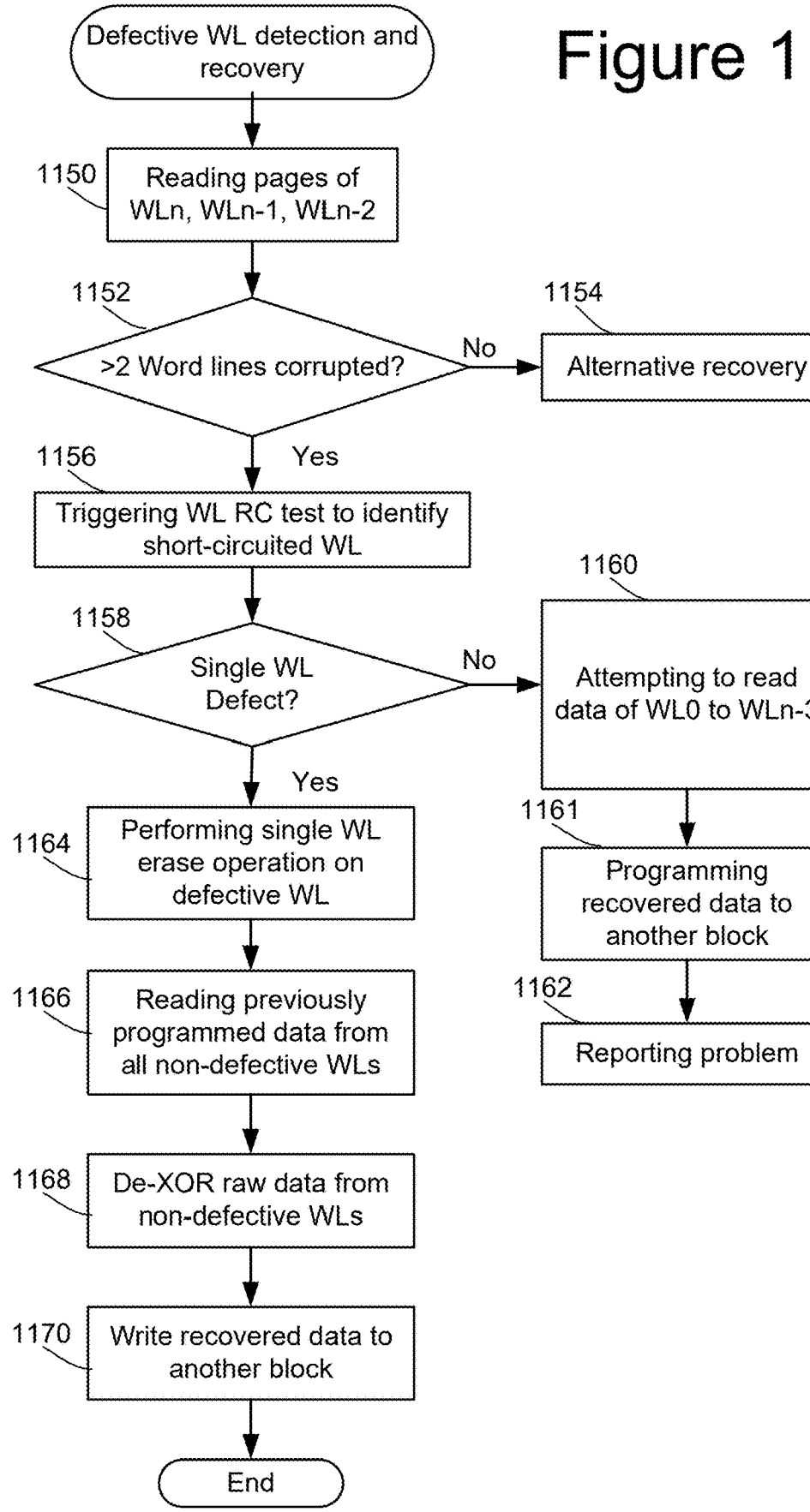

FIGS. 11A-C illustrate methods that implement aspects of the present technology. FIG. 11A shows an example of a method that includes triggering defective word line detection and recovery as a result of a write failure. The method includes receiving a host data write request 1120 and programming WLn (selected word line) of a selected block 1122. A status determination 1124 is made as to whether WLn is successfully programmed (status=pass: yes). If the selected word line is successfully programmed, then a determination 1126 is made as to whether the selected word line is the last word line in the block. If it is not the last word line in the block then the method includes returning to wait for a subsequent host write and if it is the last word line then closing the block 1128. If a write failure is detected (status=pass: no), the method includes triggering defective word line detection and recovery 1130.

FIG. 11B shows an example of a method that includes triggering defective word line detection and recovery as a result of a read failure. The method includes receiving a host data read request 1132, reading the data from NAND and decoding it 1134 (e.g., performing ECC decoding) and making a determination 1136 as to whether the decoded data passes (e.g., if it is correctable or has a Bit Error Rate or BER below a specified value). If the decoded data passes (e.g., correctable or BER below specified value), then the read is considered successful and the memory system may return data to the host 1137.

If the decoded data does not pass then a read retry is performed 1138 and another determination 1140 is made as to whether the decoded data from this read passes. If the data passes then the read is considered successful and the decoded data is returned to the host 1137.

If the decoded data does not pass, the method includes changing read voltages 1142 (e.g., all or some of voltages VrA to VrG may be changed to attempt to obtain correctable data). The method includes a reading retry using hard and/or soft bit read(s) with changed read voltages 1144 and making a determination 1146 as to whether the decoded data from the reading retry passes. Various different read schemes (e.g., different read voltages and/or other different voltages and/or times) may be used to try to obtain correctable data. If the decode operation passes then the read is considered successful and the decoded data is returned to the host 1137. If the decode operation does not pass then the method includes triggering defective WL detection and recovery 1130.

FIG. 11C illustrates an example of a method of defective word line detection and recovery (e.g., triggered at step 1130 of FIGS. 11A-B), which includes reading pages of WLn, WLn−1 and WLn−2 1150 (e.g., reading data from a predetermined number of word lines that were previously programmed). A determination 1152 is made as to whether more than two word lines are corrupted (e.g., pages from more than two word lines are uncorrectable by ECC). If more than two word lines are not corrupted (e.g., only one WL corrupted), then a defective word line as in FIG. 6 is unlikely and alternative recovery 1154 is attempted. If more than two word lines are corrupted, the method includes triggering word line RC test to identify a short-circuited word line 1156 (e.g., as illustrated in FIG. 9). If a single word line defect is not detected, the method includes attempting to read data of WL0 to WLn−3, programming the recovered data to another block 1161 and reporting the problem 1162 (e.g., reporting that the data is UECC and/or the Defective Parts Per Million (DPPM) or BER is above a limit).

If a single word line defect is detected and the defective word line is identified by RC testing, the method includes performing a single word line erase operation on the defective word line 1164 (e.g., as illustrated in FIG. 10), reading previously programmed data from all non-defective word lines 1166 (e.g., reading raw data from memory cells of WLn+1 to WLm of FIG. 10), de-XORing raw data from the non-defective word lines 1168 and writing recovered data to another block 1170 (e.g., new block), which ends the defective word line detection and recovery and the memory system may proceed to a subsequent operation. In the case where defective word line detection and recovery is triggered by a program fail (e.g., FIG. 11A) user data that failed to program may be stored with the recovered data in the new block and programming may continue in the new block. In the case where defective word line detection and recovery is triggered by a read fail (FIG. 11B), the data specified in the read command may be returned to the host. The block with the defective word line may be marked as defective (e.g., added to a bad block list) and subsequent memory access commands may be directed to the new block (e.g., a logical-to-physical address mapping may be updated to indicate that data is in the new block).

Figure 12:
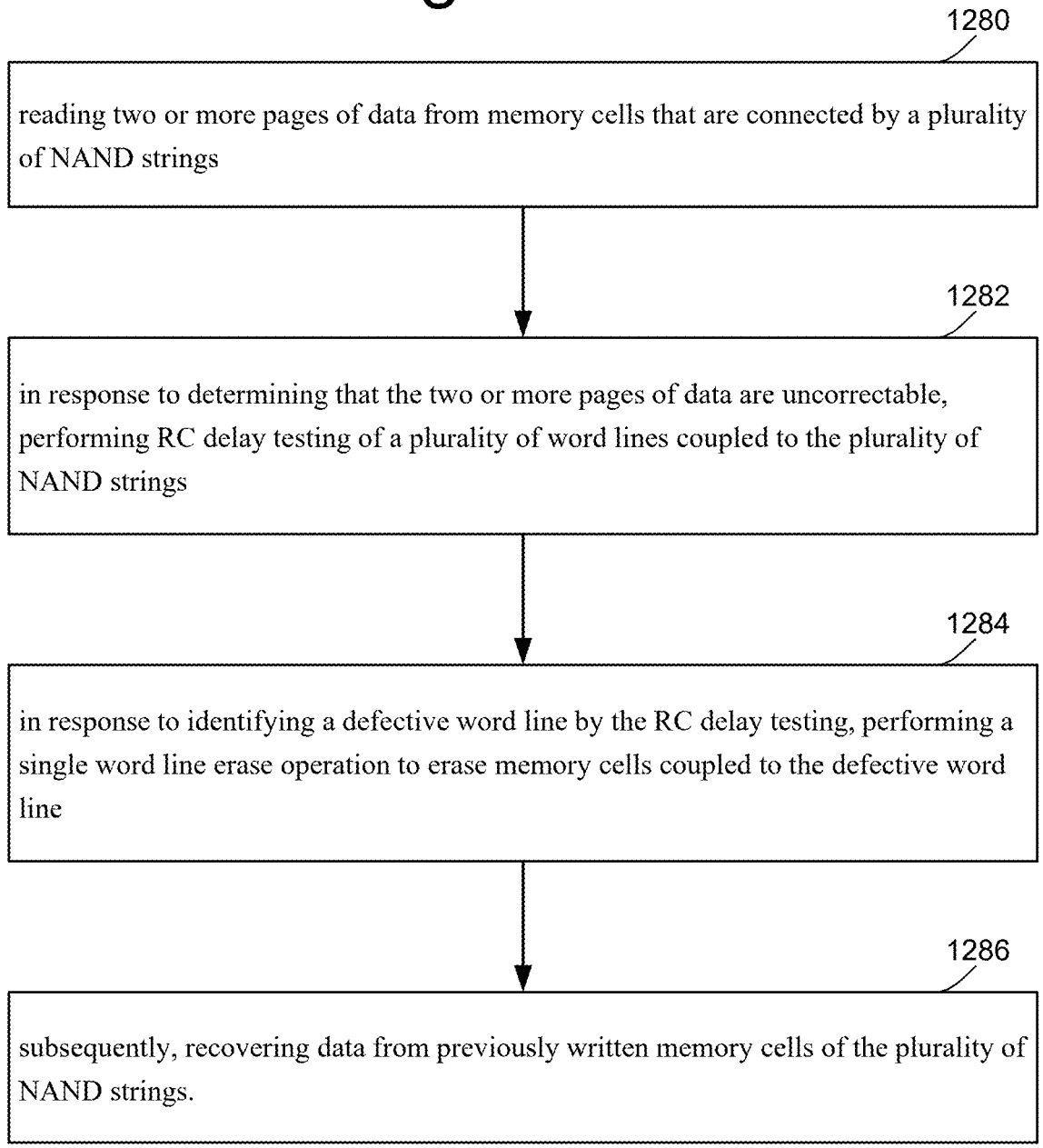
FIG. 12 shows a method that includes identifying a defective word line and performing a single word line erase operation.

FIG. 12 shows an example of a method that includes reading two or more pages of data from memory cells that are connected by a plurality of NAND strings 1280 (e.g., reading WLn−1 and WLn−2), in response to determining that the two or more pages of data are uncorrectable, performing RC delay testing of a plurality of word lines coupled to the plurality of NAND strings 1282 (e.g., as shown in FIG. 9), in response to identifying a defective word line by the RC delay testing, performing a single word line erase operation to erase memory cells coupled to the defective word line 1284 (e.g., as shown in FIG. 10) and subsequently recovering data from previously written memory cells of the plurality of NAND strings 1286, which may include reading to obtain raw data and de-XORing the raw data to obtain recovered data.

While the above examples show a single word line erase in response to a defective word line, where two or more word lines are defective (e.g., short-circuited) then the erase techniques described may be applied to the two or more word lines (e.g., sequentially as two or more single word line erase operations directed to different word lines or in parallel as a multi word line erase operation that leaves data of other word lines unaffected).

Techniques described above including the methods illustrated in FIGS. 11A-12 may be performed by any suitable control circuits. For example, any one of or any combination of memory controller 120, state machine 262, all or a portion of system control logic 260, all or a portion of row control circuitry 220, all or a portion of column control circuitry 210, read/write circuits 225, sense amps, a microcontroller, a microprocessor, and/or other similar functioned circuits may implement technology described above and may be considered examples of means for detecting a short-circuited word line, performing a single word line erase of memory cells along the short-circuited word line and recovering previously written data from memory cells in the NAND strings that are connected to the short-circuited word line with the memory cells along the short-circuited word line in the erased state.

An example of an apparatus includes one or more control circuits configured to connect to a plurality of word lines that are coupled to a plurality of NAND strings. The one or more control circuits are configured to detect a defective word line of the plurality of word lines, apply single word line erase voltages to the plurality of word lines to erase memory cells of the defective word line and with the memory cells of the defective word line in an erased state, read data from neighboring memory cells of the plurality of NAND strings.

In one or more embodiments, the one or more control circuits are configured to detect the defective word line by determining that data stored in memory cells of two or more of the plurality of word lines is uncorrectable.

In one or more embodiments, the one or more control circuits are configured to determine that the data stored in memory cells of two or more of the plurality of word lines is uncorrectable by reading the data from the memory cells using two or more different read schemes.

In one or more embodiments, the one or more control circuits are further configured to detect the defective word line by testing the plurality of word lines for RC delay.

In one or more embodiments, the one or more control circuits are configured to read data from all previously programmed memory cells of the plurality of NAND strings.

In one or more embodiments, the one or more control circuits are further configured to perform de-XOR operations on the data from the previously programmed memory cells to obtain recovered data.

In one or more embodiments, the plurality of NAND strings are in a first block and the one or more control circuits are further configured to store the recovered data in a second block.

In one or more embodiments, the one or more control circuits are configured to erase the memory cells by applying the single word line erase voltages including applying a first positive voltage to channels of the plurality of NAND strings to generate a first electric field between the defective word line and the channels that is sufficient to erase memory cells of the defective word line and applying a second positive voltage to non-defective word lines to cause a second electric field between the non-defective word lines and the channel to be insufficient to erase memory cells of the non-defective word lines.

In one or more embodiments, the plurality of NAND strings are located in a memory die of an integrated memory assembly and the one or more control circuits are located on a control die of the integrated memory assembly.

An example of a method includes reading two or more pages of data from memory cells that are connected by a plurality of NAND strings; in response to determining that the two or more pages of data are uncorrectable, performing RC delay testing of a plurality of word lines coupled to the plurality of NAND strings. The method further includes, in response to identifying a defective word line by the RC delay testing, performing a single word line erase operation to erase memory cells coupled to the defective word line and subsequently recovering data from previously written memory cells of the plurality of NAND strings.

In one or more embodiments, the method further includes prior to reading the two or more pages of data, retrying reading of a page of data connected by the plurality of NAND strings and obtaining uncorrectable data.

In one or more embodiments, retrying reading of the page of data includes using first read voltages in a first retry and using second read voltages in a second retry.

In one or more embodiments, recovering data from previously written memory cells of the plurality of NAND strings includes reading raw data from the previously written memory cells and performing de-XOR operations to obtain de-XORed data.

In one or more embodiments, the method further includes storing the de-XORed data in a block that does not include the plurality of NAND strings.

In one or more embodiments, performing RC delay testing of the plurality of word lines includes measuring times required to charge word lines to a target level and identifying the defective word line from a time required to charge the defective word line being outside an acceptable range.

In one or more embodiments, applying the single word line erase includes: applying a first positive voltage on bit lines connected to the plurality of NAND strings while drain select switches are on to bring channels of the plurality of NAND strings to a positive voltage and generate a first electric field between the channels and the defective word line; subsequently, turning off drain side select transistors to electrically isolate the channels; and subsequently, applying a second positive voltage on non-defective word lines to boost channel voltage and increase the first electric field such that the first electric field is sufficient to cause erasing of memory cells and a second electric field between the non-defective word lines and the channels is insufficient to cause erasing of memory cells.

In one or more embodiments, reading the two or more pages of data from memory cells that are connected by the plurality of NAND strings is performed in response to a program failure while attempting to program user data in memory cells of the plurality of NAND strings, the method further comprising programming the user data and the data from previously written memory cells of the plurality of NAND strings in a block that does not include the plurality of NAND strings.

An example of a data storage system includes a plurality of nonvolatile memory cells arranged in NAND strings; and means for detecting a short-circuited word line, performing a single word line erase of memory cells along the short-circuited word line and recovering previously written data from memory cells in the NAND strings that are connected to the short-circuited word line with the memory cells along the short-circuited word line in an erased state.

In one or more embodiments, the NAND strings are vertical NAND strings in a 3D nonvolatile memory structure.

In one or more embodiments, the 3D nonvolatile memory structure is formed on a memory die and the means for detecting are formed on a control die that is coupled to the memory die in an integrated memory assembly.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
one or more control circuits configured to connect to a plurality of word lines that are coupled to memory cells of a plurality of NAND strings that include channels, each memory cell having a threshold voltage range corresponding to an erased state and one or more programmed states, the one or more control circuits are configured to:
determine that the plurality of word lines includes a defective word line and a plurality of non-defective word lines, apply single word line erase voltages to the plurality of non-defective word lines and to the channels of the plurality of NAND strings, the single word line erase voltages generating a first electric field between the channels and the defective word line that is sufficient to erase memory cells of the defective word line to bring them to the erased state, the single word line erase voltages generating a second electric field between the channels and each of the plurality of non-defective word lines that is not sufficient to erase memory cells of the non-defective word lines and with the memory cells of the defective word line in the erased state, read data from the memory cells of the non-defective word lines.

2. The apparatus of claim 1, wherein the one or more control circuits are configured to detect the defective word line by determining that data stored in memory cells of two or more of the plurality of word lines is uncorrectable.

3. The apparatus of claim 2, wherein the one or more control circuits are configured to determine that the data stored in memory cells of two or more of the plurality of word lines is uncorrectable by reading the data from the memory cells using two or more different read schemes.

4. The apparatus of claim 2, wherein the one or more control circuits are further configured to detect the defective word line by testing the plurality of word lines for Resistance-Capacitance (RC) delay.

5. The apparatus of claim 1, wherein the one or more control circuits are configured to read data from all previously programmed memory cells of the plurality of NAND strings.

6. The apparatus of claim 5, wherein the one or more control circuits are further configured to perform de-XOR operations on the data from the previously programmed memory cells to obtain recovered data.

7. The apparatus of claim 6, wherein the plurality of NAND strings are in a first block and the one or more control circuits are further configured to store the recovered data in a second block.

8. The apparatus of claim 1, wherein the one or more control circuits are configured to erase the memory cells by applying the single word line erase voltages including applying a first positive voltage to channels of the plurality of NAND strings to generate the first electric field between the defective word line and the channels that is sufficient to erase memory cells of the defective word line and applying a second positive voltage to the plurality of non-defective word lines to cause the second electric field between the non-defective word lines and the channel to be less than the first electric field and to be insufficient to erase memory cells of the non-defective word lines.

9. The apparatus of claim 1, wherein the plurality of NAND strings are located in a memory die of an integrated memory assembly and the one or more control circuits are located on a control die of the integrated memory assembly.

10. A method comprising:
reading two or more pages of data from memory cells that are connected by a plurality of NAND strings;
in response to determining that the two or more pages of data are uncorrectable, performing Resistance-Capacitance (RC) RC delay testing of a plurality of word lines coupled to the plurality of NAND strings;
in response to identifying a defective word line by the RC delay testing, performing a single word line erase operation by generating a first electric field between NAND string channels and the defective word line while generating a second electric field that is less than the first electric field between the NAND string channels and non-defective word lines to erase memory cells coupled to the defective word line such that they are brought to an erased state while memory cells coupled to non-defective word lines are not erased; and
subsequently, reading data from the memory cells coupled to the non-defective word lines while the memory cells coupled to the defective word line are in the erased state.

11. The method of claim 10, further comprising:
prior to reading the two or more pages of data, retrying reading of a page of data connected by the plurality of NAND strings and obtaining uncorrectable data.

12. The method of claim 11, wherein retrying reading of the page of data includes using first read voltages in a first retry and using second read voltages in a second retry.

13. The method of claim 10, wherein recovering data from previously written memory cells of the plurality of NAND strings includes reading raw data from the previously written memory cells and performing de-XOR operations to obtain de-XORed data.

14. The method of claim 13, further comprising storing the de-XORed data in a block that does not include the plurality of NAND strings.

15. The method of claim 10, wherein performing the Resistance-Capacitance (RC) delay testing of the plurality of word lines includes measuring times required to charge word lines to a target level and identifying the defective word line from a time required to charge the defective word line being outside an acceptable range.

16. The method of claim 10, wherein applying the single word line erase includes:
applying a first positive voltage on bit lines connected to the plurality of NAND strings while drain select switches are on to bring channels of the plurality of NAND strings to a positive voltage and generate the first electric field between the channels and the defective word line;

subsequently, turning off drain side select transistors to electrically isolate the channels; and subsequently, applying a second positive voltage on non-defective word lines to boost channel voltage and increase the first electric field such that the first electric field is sufficient to cause erasing of memory cells and the second electric field between the non-defective word lines and the channels is insufficient to cause erasing of memory cells.

17. The method of claim 10, wherein reading the two or more pages of data from memory cells that are connected by the plurality of NAND strings is performed in response to a program failure while attempting to program user data in memory cells of the plurality of NAND strings, the method further comprising programming the user data and the data from previously written memory cells of the plurality of NAND strings in a block that does not include the plurality of NAND strings.

18. A data storage system comprising:

a plurality of nonvolatile memory cells arranged in NAND strings, each NAND string having a channel and each memory cell having a threshold voltage range corresponding to an erased state and one or more programmed states; and means for detecting a short-circuited word line of a plurality of word lines that are coupled to the plurality of nonvolatile memory cells, performing a single word line erase of memory cells along the short-circuited word line by generating a first electric field between the channels and the short-circuited word line that is sufficient to erase memory cells of the short-circuited word line to bring them to the erased state while generating a second electric field between the channels and other word lines of the plurality of word lines that is not sufficient to erase memory cells of the other word lines and reading previously written data from memory cells of the other word lines of the plurality of word lines with the memory cells along the short-circuited word line in the erased state.

19. The data storage system of claim 18, wherein the NAND strings are vertical NAND strings in a 3D nonvolatile memory structure.

20. The data storage system of claim 19, wherein the 3D nonvolatile memory structure is formed on a memory die and the means for detecting are formed on a control die that is coupled to the memory die in an integrated memory assembly.

* * * * *